US011052597B2

(12) United States Patent
MacCurdy et al.

(10) Patent No.: US 11,052,597 B2
(45) Date of Patent: Jul. 6, 2021

(54) ADDITIVE MANUFACTURING OF VISCOELASTIC MATERIALS

(71) Applicant: Massachusetts Institute of Technology, Cambridge, MA (US)

(72) Inventors: Robert Bruce MacCurdy, Belchertown, MA (US); Daniela Rus, Weston, MA (US); Jeffrey Ian Lipton, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 389 days.

(21) Appl. No.: 15/597,068

(22) Filed: May 16, 2017

(65) Prior Publication Data

US 2017/0326785 A1 Nov. 16, 2017

Related U.S. Application Data

(60) Provisional application No. 62/336,803, filed on May 16, 2016.

(51) Int. Cl.
 *B29C 64/129* (2017.01)
 *B33Y 10/00* (2015.01)
 (Continued)

(52) U.S. Cl.
 CPC .......... *B29C 64/129* (2017.08); *B29C 64/112* (2017.08); *B33Y 10/00* (2014.12); *B33Y 80/00* (2014.12)

(58) Field of Classification Search
 CPC ..... B29C 64/112; B29C 64/129; B29C 64/40; B29C 64/336; B29C 64/20; B33Y 80/00
 See application file for complete search history.

(56) References Cited

U.S. PATENT DOCUMENTS 529,719 A   11/1894  Eils
2,104,742 A  1/1938  Fleischer
(Continued)

FOREIGN PATENT DOCUMENTS

AT         006 615 U1    1/2004
DE   20 2008 015 143 U1  3/2009
(Continued)

OTHER PUBLICATIONS

3D Printing (Photolithography), MRSEC Education Group, University of Wisconsin—Madison. Accesed: Nov. 23, 2016.
(Continued)

*Primary Examiner* — Marc C Howell
*Assistant Examiner* — Debjani Roy
(74) *Attorney, Agent, or Firm* — Hamilton, Brook, Smith & Reynolds, P.C.

(57) ABSTRACT

Described is a method of forming a structure having viscoelastic properties. The method can include a) depositing a layer of droplets of a solidifying material and a non-solidifying material, the droplets being deposited according to an occupancy matrix specifying voxels for the solidifying and non-solidifying materials, the solidifying and non-solidifying material being interspersed within the occupancy matrix, the occupancy matrix being generated by a probabilistic function; b) exposing the droplets of solidifying material to ultraviolet radiation to cure the solidifying material; and c) repeating a) and b) to deposit additional layers of droplets of solidifying and non-solidifying materials, thereby forming the structure having viscoelastic properties.

20 Claims, 24 Drawing Sheets
(21 of 24 Drawing Sheet(s) Filed in Color)

(51) Int. Cl.
*B29C 64/112* (2017.01)
*B33Y 80/00* (2015.01)

(56) References Cited

U.S. PATENT DOCUMENTS

| | | | |
|---|---|---|---|
| 2,414,716 A | 1/1947 | Carson | |
| 2,490,586 A | 12/1949 | Embree | |
| 2,680,501 A | 6/1954 | Cunningham | |
| 2,765,159 A | 10/1956 | Garofalo | |
| 3,019,552 A | 2/1962 | Schleich | |
| 3,081,514 A | 3/1963 | Griswold | |
| 3,125,195 A | 3/1964 | Moore | |
| 3,389,451 A | 6/1968 | Speca et al. | |
| 3,391,048 A | 7/1968 | Dyer et al. | |
| 3,468,748 A | 9/1969 | Bassett | |
| 4,107,870 A | 8/1978 | Ausnit | |
| 4,205,152 A | 5/1980 | Mizuguchi et al. | |
| 4,290,170 A | 9/1981 | Brookstein et al. | |
| 4,575,330 A | 3/1986 | Hull | |
| 4,674,580 A | 6/1987 | Schuh | |
| 4,735,418 A | 4/1988 | Engel | |
| 4,777,859 A | 10/1988 | Plummer, Jr. | |
| 4,978,564 A | 12/1990 | Douglas | |
| 5,281,181 A | 1/1994 | McCollum | |
| 5,853,313 A | 12/1998 | Zheng | |
| 5,928,803 A | 7/1999 | Yasuda | |
| 6,012,494 A | 1/2000 | Balazs | |
| 6,175,422 B1 * | 1/2001 | Penn | B33Y 50/00 358/1.1 |
| 6,264,199 B1 | 7/2001 | Schaedel | |
| 6,569,373 B2 | 5/2003 | Napadensky | |
| 7,007,370 B2 | 3/2006 | Gracias et al. | |
| 7,160,612 B2 | 1/2007 | Magill et al. | |
| 7,216,678 B2 | 5/2007 | Baer | |
| 7,225,045 B2 | 5/2007 | Gothait et al. | |
| 7,300,619 B2 | 11/2007 | Napadensky et al. | |
| 7,500,846 B2 | 3/2009 | Eshed et al. | |
| 7,575,807 B1 | 8/2009 | Barvosa-Carter et al. | |
| 7,851,122 B2 | 12/2010 | Napadensky | |
| 7,862,624 B2 | 1/2011 | Tran | |
| 8,082,696 B2 | 12/2011 | Oliver | |
| 8,424,249 B2 | 4/2013 | Oliver | |
| 8,475,074 B1 | 7/2013 | Henry | |
| 8,652,602 B1 | 2/2014 | Dolla | |
| 8,992,183 B2 | 3/2015 | Perich et al. | |
| 9,079,337 B2 | 7/2015 | Lipton et al. | |
| D744,719 S | 12/2015 | Amarasiriwardena | |
| 9,487,387 B2 | 11/2016 | MacCurdy et al. | |
| 9,723,866 B2 | 8/2017 | Lipson et al. | |
| 9,987,907 B1 | 6/2018 | Temchenko | |
| 9,993,104 B2 | 6/2018 | Lipton et al. | |
| 10,005,235 B2 | 6/2018 | Millar | |
| 10,118,339 B2 | 11/2018 | Lipton et al. | |
| 10,132,931 B2 | 11/2018 | MacCurdy et al. | |
| 10,150,258 B2 | 12/2018 | Feinberg et al. | |
| 10,166,726 B2 | 1/2019 | Fripp et al. | |
| 10,259,161 B2 | 4/2019 | Lipton et al. | |
| 10,513,089 B2 | 12/2019 | Tibbits et al. | |
| 10,549,505 B2 | 2/2020 | Tibbits et al. | |
| 10,633,772 B2 | 4/2020 | Tibbits et al. | |
| 2002/0043950 A1 | 4/2002 | Yim et al. | |
| 2002/0104973 A1 | 8/2002 | Kerekes | |
| 2002/0116847 A1 | 8/2002 | Yen | |
| 2002/0125790 A1 | 9/2002 | Horning et al. | |
| 2003/0090034 A1 | 5/2003 | Mülhaupt et al. | |
| 2003/0177749 A1 | 9/2003 | Jen | |
| 2004/0197519 A1 | 10/2004 | Elzey et al. | |
| 2004/0244309 A1 | 12/2004 | Rauc | |
| 2005/0227560 A1 | 10/2005 | Allred, III | |
| 2006/0016507 A1 | 1/2006 | Baer | |
| 2006/0184231 A1 | 8/2006 | Rucker | |
| 2006/0186700 A1 | 8/2006 | Browne et al. | |
| 2007/0036964 A1 | 2/2007 | Rosenberger et al. | |
| 2007/0106173 A1 | 5/2007 | Korotko et al. | |
| 2007/0134486 A1 | 6/2007 | Bansal et al. | |
| 2007/0163305 A1 | 7/2007 | Baer et al. | |
| 2008/0027199 A1 | 1/2008 | Mazurek et al. | |
| 2008/0057809 A1 | 3/2008 | Rock | |
| 2008/0066393 A1 | 3/2008 | Sorensen | |
| 2008/0075850 A1 | 3/2008 | Rock | |
| 2008/0075930 A1 | 3/2008 | Kornbluh et al. | |
| 2008/0105324 A1 | 5/2008 | Bear | |
| 2008/0109103 A1 | 5/2008 | Gershenfeld et al. | |
| 2008/0234458 A1 | 9/2008 | West | |
| 2008/0269420 A1 | 10/2008 | Tong et al. | |
| 2008/0282527 A1 | 11/2008 | Beck et al. | |
| 2009/0176054 A1 | 7/2009 | Laib et al. | |
| 2009/0218307 A1 | 9/2009 | Davies et al. | |
| 2009/0233067 A1 | 9/2009 | Doornheim et al. | |
| 2010/0168439 A1 | 7/2010 | Olson | |
| 2010/0191360 A1 * | 7/2010 | Napadensky | G06T 17/00 700/98 |
| 2010/0199582 A1 | 8/2010 | Oliver et al. | |
| 2011/0285052 A1 * | 11/2011 | Wigand | B33Y 30/00 264/219 |
| 2012/0037263 A1 | 2/2012 | Malloy | |
| 2012/0068378 A1 | 3/2012 | Swanson et al. | |
| 2012/0091744 A1 | 4/2012 | McKnight et al. | |
| 2012/0094060 A1 | 4/2012 | Gershenfeld et al. | |
| 2012/0133080 A1 | 5/2012 | Moussa et al. | |
| 2012/0137611 A1 | 6/2012 | Oliver | |
| 2012/0308805 A1 * | 12/2012 | Sella | B29C 31/10 428/222 |
| 2013/0040091 A1 | 2/2013 | Dikovsky et al. | |
| 2013/0073068 A1 | 3/2013 | Napadensky | |
| 2013/0078415 A1 | 3/2013 | Rock | |
| 2013/0089642 A1 | 4/2013 | Lipson et al. | |
| 2013/0243997 A1 | 9/2013 | Spadaccini et al. | |
| 2013/0246018 A1 | 9/2013 | Spadaccini et al. | |
| 2013/0249981 A1 * | 9/2013 | Nakagawa | B41J 2/04501 347/9 |
| 2014/0013962 A1 | 1/2014 | Lipton et al. | |
| 2014/0037873 A1 | 2/2014 | Cheung et al. | |
| 2014/0050811 A1 | 2/2014 | Lipton et al. | |
| 2014/0059734 A1 | 3/2014 | Toronjo | |
| 2014/0101816 A1 | 4/2014 | Toronjo | |
| 2014/0265032 A1 | 9/2014 | Teicher et al. | |
| 2014/0311187 A1 | 10/2014 | Amarasiriwardena et al. | |
| 2015/0014881 A1 * | 1/2015 | Elsey | B33Y 10/00 264/219 |
| 2015/0017411 A1 | 1/2015 | Wilkie et al. | |
| 2015/0075033 A1 | 3/2015 | Cross et al. | |
| 2015/0158244 A1 | 6/2015 | Tibbits et al. | |
| 2015/0174885 A1 | 6/2015 | Khan | |
| 2016/0009029 A1 | 1/2016 | Cohen et al. | |
| 2016/0023403 A1 | 1/2016 | Ramos | |
| 2016/0067918 A1 | 3/2016 | Millar | |
| 2016/0101594 A1 | 4/2016 | Tibbits et al. | |
| 2016/0121546 A1 | 5/2016 | Yao et al. | |
| 2016/0208476 A1 | 7/2016 | Wadley et al. | |
| 2016/0214321 A1 | 7/2016 | Tow et al. | |
| 2016/0317939 A1 | 11/2016 | Fernandez et al. | |
| 2016/0318255 A1 | 11/2016 | Ou et al. | |
| 2016/0340814 A1 | 11/2016 | Ridley et al. | |
| 2016/0340826 A1 | 11/2016 | Tibbits et al. | |
| 2017/0042034 A1 | 2/2017 | MacCurdy et al. | |
| 2017/0057704 A1 | 3/2017 | Li et al. | |
| 2017/0106594 A1 * | 4/2017 | Gardiner | B29C 31/045 |
| 2017/0120535 A1 | 5/2017 | MacCurdy et al. | |
| 2017/0145694 A1 | 5/2017 | Carney et al. | |
| 2017/0182723 A1 | 6/2017 | Calisch et al. | |
| 2018/0021140 A1 | 1/2018 | Angellini et al. | |
| 2018/0156204 A1 | 6/2018 | Lipton | |
| 2018/0187337 A1 | 7/2018 | Iseki | |
| 2018/0194106 A1 | 7/2018 | Tibbits et al. | |
| 2018/0195213 A1 | 7/2018 | Tibbits et al. | |
| 2018/0281295 A1 | 10/2018 | Tibbits et al. | |
| 2018/0291535 A1 | 10/2018 | Ridley et al. | |
| 2018/0311833 A1 | 11/2018 | Lipton et al. | |
| 2019/0039309 A1 | 2/2019 | Busbee et al. | |
| 2019/0084282 A1 | 3/2019 | Prasad et al. | |

(56) References Cited

U.S. PATENT DOCUMENTS

| | | |
|---|---|---|
| 2019/0291350 A1 | 9/2019 | Feinberg et al. |
| 2020/0016833 A1 | 1/2020 | Yuwaki et al. |

FOREIGN PATENT DOCUMENTS

| | | |
|---|---|---|
| DE | 20 2009 000 5 | 4/2009 |
| EP | 1274559 B1 | 1/2003 |
| FR | 1331581 A | 7/1963 |
| FR | 1243060 A | 10/1967 |
| FR | 2479923 | 4/1980 |
| FR | 2583334 A1 | 12/1986 |
| FR | 2956590 | 8/2011 |
| GB | 2455167 A | 6/2009 |
| JP | H07 42024 A | 2/1995 |
| WO | WO 00/69747 A1 | 11/2000 |
| WO | 0178968 A1 | 10/2001 |
| WO | 2014014892 A2 | 1/2014 |
| WO | WO 2014/025089 A1 | 2/2014 |
| WO | 2015/017421 A2 | 2/2015 |
| WO | WO 2015/084422 A1 | 6/2015 |
| WO | WO 2015/139095 A1 | 9/2015 |
| WO | WO 2016/057853 A1 | 4/2016 |
| WO | WO 2017/079475 A1 | 5/2017 |
| WO | 2017081040 A1 | 5/2018 |
| WO | WO 2018/088965 A1 | 5/2018 |
| WO | 2018187514 A1 | 10/2018 |

OTHER PUBLICATIONS

A Brief History of 3D Printing, T. Rowe Price, 1 page (2012).
About Additive Manufacturing, Additive Manufacturing Research Group, Loughborough University, copyright 2016, http://www.lboro.ac.uk!research/amrg/about/the7categoriesofadditivemanufacturing/.
Aguilera, E., et al., "3D Printing of Electro Mechanical Systems," *24th International SFF Symposium—An Additive Manufacturing Conference, SFF 2013*, pp. 950-961 (2013).
Ahn, J-H., et al., "Heterogeneous Three-Dimensional Electronics by Use of Printed Semiconductor Nanomaterial," *Science*, 314: 1754-1757 (2006).
Akhavan, V., et al., "Reacting Thick-Film Copper Conductive Inks with Photonic Curing," 5 pages (2013).
Altan, T., et al., "Manufacturing of Dies and Molds," 19 pages (2001).
Armon, Shahaf et al., "Geometry and Mechanics in the Opening of Chiral Seed Pods," *Science*, 333: 1726-1730 (2011).
Bailey, S.A., et al., "Biomimetic Robotic Mechanisms via Shape Deposition Manufacturing," pp. 1-8 (2000).
Bartlett, Nicholas W., et al., "A 3D-printed, functionally graded soft robot powered by combustion," *Science*, 349(6244): 161-166 (Jul. 10, 2015).
Bendsoe, M.P. and Kikuchi, N., "Generating Optimal Topologies in Structural Desing Using a Homogenization Method," *Comp. Meth. App. Mech. Eng.*, 71: 197-224 (1988).
Berman, B., "3-D Printing: The New Industrial Revolution," *Business Horizons*, 55: 155-162 (2012).
Bhargava, K. et al., "Discrete Elements for 3D Microfluidics," *PNAS*, 111(42): 15013-15018 (2014).
Bicchi, A. and Tonietti, G., "Fast and 'Soft-Arm' Tactics," *IEEE Robotics & Automation Magazine*, 22-33 (2004).
Blakely, Andrew M., "Bio-Pick, Place, and Perfuse: A New Instrument for 3D Tissue Engineering," *Tissue Engineering*: Part C, vol. 00, No. 00, pp. 1-10 (2015).
Borghino, D., "Voxel8 Paves the Way for 3D-Printed Electronics," Accessed at www.gizmag.com pp. 1-6 (Jan. 14, 2015).
Bruyas, A., et al., "Combining Multi-Material Rapid Prototyping and Pseudo-Rigid Body Modeling for a New Compliant Mechanism," *2014 IEEE International Conference on Robotics & Automation (ICRA)*, pp. 3390-3396 (2014).

Cali, J., et al., "3D-Printing of Non-Assembly, Articulated Models," *ACM Trans. Graph.*, Article No. 130, 31(6): 1-8 (2012).
Cantatore, E., "Applications of Organic and Printed Electronics, A Technology-Enabled Revolution," Springer Publishers, ISBN No. 978-1-4614-3159-6, pp. 1-187 (2013).
Chandler, David L. Printing off the Paper. MIT News (2011); available at: http://web.mit.edu/newsoffice/2011/3d-printing-0914.html, 4 pages, (last visited: Mar. 3, 2014).
Cheney, N., et al., "Unshackling Evolution," *SIGEVOlution*, 7(1): 11-23 (2013).
Christenson, K.K., et al., "Direct Printing of Circuit Boards Using Aerosol Jet®," *Tech. Prog. Proc.*, pp. 433-436 (2011).
Church, K., et al., "Commercial Applications and Review for Direct Write Technologies," *Mat. Res. Soc. Symp. Proc.*, 624: 3-8 (2000).
Comber, D.B., et al., "Design, Additive Manufacture, and Control of a Pneumatic MR-Compatible Needle Driver," *IEEE Trans. Rob.*, 1-12 (2015).
Coros, S., et al., "Computational Design of Mechanical Characters," 12 pages (2013).
De Laurentis, K.J., et al., "Procedure for Rapid Fabrication of Non-Assembly Mechanisms with Embedded Components," *Proceedsing of DETC '02: ASME 2002 Design Engineering Technical Conferences and Computers and Information in Engineering Conference*, pp. 1-7 (2002).
Derby, B., "Inkjet Printing of Functional and Structural Materials: Fluid Property Requirements, Feature Stability, and Resolution," *Annu. Rev. Mater. Res.*, 40: 395-414 (2010).
Dimas, L.S., et al., "Tough Composites Inspired by Mineralized Natural Materials: Computation, 3D Printing, and Testing," *Adv. Funct. Mater.*, 23(36): 1-10 (2013).
Doubrovski, E.L., et al., "Voxel-Based Fabrication Through Material Property Mapping: A Design Method for Bitmap Printing," *Computer-Aided Design*, 60: 3-13 (2015).
Dutta, D., et al., "Layered Manufacturing: Current Status and Future Trends," *Trans. ASME*, 1:60-71 (Mar., 2001).
Eaton, M., et al., "The Modelling, Prediction, and Experimental Evaluation of Gear Pump Meshing Pressures with Particular Reference to Aero-Engine Fuel Pumps," *Proc. IMechE*, 220 (Part 1): 365-379 (2006).
Espalin, D., et al., "3D Printing Multifunctionality: Structures with Elements," *Int. J. Adv. Manuf. Technol.*, 72: 963-978 (2014).
Ferry, P.W., et al., "A Review on Stereolithography and Its Applications in Biomedical Engineering," *Biomat.*, 31: 6121-6130 (2010).
Fuller, S.B., et al., "Ink-Jet Printed Nanoparticle Microelectromechanical Systems,"*J. Microelec. Sys.*, 11(1): 54-60 (2002).
Ge, Qi, et al., "Active materials by four-dimension printing," *Applied Physics Letters*, 103: 131901-131901-5 (2013).
Gong, H., et al., "High Density 3D Printed Microfluidic Valves, Pumps, and Multiplexers, Lab on a Chip" *Royal Society of Chemistry*, 9 pages (2016).
Grunewald, S., "Nano Dimension Unveils the DragonFly 2020, World's First Desktop Electronic 3D Printer," Downloaded from https://3DPrint.com, *The Voice of 3D Printing Technologies*, pp. 15 (Nov. 18, 2015).
Grzesiak, A., et al., "The Bionic Handling Assistant: A Success Story of Additive Manufacturing," Assemb. Autom., 31(4): 329-333 (2011).
Guan, J. et al. "Self-Folding of Three-Dimensional Hydrogel Microstructures," *Journal of Physical Chemistry B*, 109:23134-23137 (2005).
Hawkes et al. Programmable matter by folding, *PNAS*, vol. 107(28): 12441-12445 (2010).
Hiller, J. and Lipson, H., "Automatic Design and Manufacture of Soft Robots," IEEE Trans. Rob., 28(2): 457-466 (2012).
Hiller, J. and Lipson, H., "Methods of Parallel Voxel Manipulation for 3D Digital Printing," pp. 200-211 (2007).
Hiller, J. and Lipson, H., "Tunable Digital Material Properties for 3D Voxel Printers," *Rapid Prototyping Journal*, 16(4): 241-247 (2009).
Hiller, J.D., et al., "Microbricks for Three-Dimensional Reconfigurable Modular Microsystems," *J. Microelec. Sys.*, 20(5): 1089-1097 (2011).

(56) References Cited

OTHER PUBLICATIONS

Huber, C., et al., 3D Print of Polymer Bonded Rare-Earth Magnets, and 3D Magnetic Field Scanning with an End-User 3D Printer, *Applied Physics Letters*, 109: 162401-1-162401-4 (2016).

Ionov, L., "Soft Microorigami: self-folding polymer films," *Soft Matter*, 7: 6786 (Published online May 24, 2011).

Jeffrey, C., "V-One Conductive Ink Printer Aims to Short-Circuit Electronic Prototyping," accessed on www.gizmag.com pp. 1-6 (Feb. 10, 2015).

Jeong, K-U. et al., "Three-dimensional actuators transformed from the programmed two-dimensional structures via bending, twisting and folding mechanisms," *Journal of Materials Chemistry*, 21: 6824-6830 (2011).

Jung et al., "Water-responsive shape memory polyurethane block copolymer modified with polyhedral oligomeric silsesquioxane," *Journal of Macromolecular Science*, Part B, 45: 453-461 (2006).

Kang, H., et al., "Direct Intense Pulsed Light Sintering of Inkjet-Printed Copper Oxide Layers within Six Milliseconds," *ACS Appl. Mater. Interfaces*, 6:1682-1687 (2014).

Kanthal Thermostatic Bimetal Handbook, Kanthal AB, pp. 1-134 (2008).

Klein, Yael, et al. "Shaping of Elastic Sheets by Prescription of Non-Euclidean Metrics," *Science*, 315:1116-1120 (2007).

Kolesky, D.B., et al., "3D Bioprinting of Vascularized, Heterogeneous Cell-Laden Tissue Constructs," *Adv. Mater.*, 26:3124-3130 (2014).

Kong, Y.L., et al., "3D Printed Quantum Dot Light-Emitting Diodes," *Nano. Lett.*, 14:7017-7023 (2014).

Knuth, J.P., et al., "Progress in Additive Manufacturing and Rapid Prototyping," *Annals CIRP*, 47(2): 525-540 (1998).

Kuehn, T. and Rieffel, J., "Automatically Designing and Printing 3-D Objects with EvoFab 0.2," *Artificial Life*, 13: 372-378 (2012).

Laschi, C., et al., "Soft Robot Arm Inspired by the Octopus," *Adv. Rob.*, 26: 709-727 (2012).

Li, B., et al., "Robust Direct-Write Dispensing Tool and Solutions for Micro/Meso-Scale Manufacturing and Packaging," *ASME Proceedings of the 2007 International Maufacturing Science and Engineering Conference*, pp. 1-7 (2007).

Li, X., "Embedded Sensors in Layered Manufacturing," *Dissertation submitted to Stanford University*, pp. 1-152 (Jun. 2001).

Lin, H.-T., et al., "GoQBot: A Caterpillar-Inspired Soft-Bodied Rolling Robot," *Bioinsp. Biomim.*, 6: 1-14 (2011).

Lipson, H., "Challenges and Opportunities for Design, Simulation, and Fabrication of Soft Robots," Soft Robotics, 1(1): 21-27 (2014).

Lipson, H., and Kurman, M., "Factory@Home—The Emerging Economy of Personal Manufacturing," One of a series of Occasional Papers in Science and Technology Policy, pp. 1-103 (Dec. 2010).

Lipton, J. et al., "Fab@Home Model 3: A More Robust, Cost Effective and Accessible Open Hardware Fabrication Platform," 125-135 (2012).

Liu, Y., et al., "Self-Folding by Local Light Absorption," screenshots provided, full video available at: http://www.youtube.com/watch?v=NKRWZG67dtQ, pp. 1-10, (Nov. 10, 2011).

Liu, Y., et al., "Self-folding of polymer sheets using local light absorption," Soft Matter 8(6): 1764-1769 (2012).

Louis-Rosenberg, J., "Drowning in Triangle Soup: The Quest for a Better 3-D Printing File Format," *XRDS*, 22(3): 58-62 (2016).

MacCurdy, R., et al., "Bitblox: Printable Digital Materials for Electromechanical Machines," Int'l J. Robotics Res., 33(10), 1342-1360 (2014).

MacCurdy, R., et al., "Printable Hydraulics: A Method for Fabricating Robots by 3D Co-Printing Solids and Liquids," *2016 IEEE International Conference on Robotics and Automation (ICRA)*, pp. 1-8 (2016).

MacCurdy, R., et al., "Printable Programmable Viscoelastic Materials for Robots," *IEEE/RSJ International Conference on Intelligent Robots and Systems (IROS)*, pp. 1-8 (2016).

MacDonald, E., et al., "3D Printing for the Rapid Prototyping of Structural Electronics," *IEEE*, 2:234-242 (2014).

Macdonald, N.P., et al., "Assessment of Biocompatibility of 3D Printed Photopolymers Using Zebrafish Embryo Toxicity Assays," *Royal Society of Chemistry—Lab on a Chip*, 16: 291-297 (2016).

Mack, E., "Beyond 3D Printers and the Coming of the Home Electronics Factory," www.gizmag.com, pp. 1-5 (Oct. 22, 2014).

Malone, E., and Lipson, H., "Multi-Material Freeform Fabrication of Active Systems," *Proceedings of the 9$^{th}$ Biennial ASME Conference on Engineering Systems Design and Analysis*, pp. 1-9, (2008).

Mannoor, M.S., et al., "3D Printed Bionic Ears," *Nano. Lett.*, 13: 2634-2639 (2013).

Mao, Y., et al., "Scientific Reports: Sequential Self-Folding Structures by 3D Printed Digital Shape Memory Polymers," *Nature*, pp. 1-12 (2015).

Marchese, A.D., et al., "A Recipe for Soft Fluidic Elastomer Robots," *Soft Robotics*, 2(1): 7-25 (2015).

Mehta, A., et al., "Cogeneration of Mechanical, Electrical, and Software Design for Printable Robots from Structural Specifications," *Int. Rob. Sys.*: 2892-2897 (2014).

Mehta, A., et al., "Integrated Codesign of Printable Robots," *J. Mech. Rob.*, 7: 1-10 (2015).

Meisel, N.A., et al., "A Procedure for Creating Actuated Joints via Embedding Shape Memory Alloys in Polyjet 3D Printing," *J. Intel. Mat. Sys. Struct.*, pp. 1-15 (2014).

Melchels, F. P.W., et al., "A review on stereolithography and its applications in biomedical engineering," *Biomaterials*, 31:6121-6130 (2010).

Merz, R, "Shape Deposition Manufacturing," *Proceedings of the Solid Freeform Fabrication Symposium*, The University of Texas at Austin, pp. 1-7 (1994).

Merz, R, et al., Dissertation entitled "Shape Deposition Manufacturing," pp. 1-190 (1994).

Mironov, V., et al., "Organ Printing: Computer-Aided Jet-Based 3D Tissue Engineering," *Trends Biotech.*, 21(4):157-161 (2003).

Morin, S.A., et al., "Using Click-e-Bricks to Make 3D Elastomeric Structures,"*Adv. Mater.*, 26: 5991-5999 (2014).

Mueller, S., et al., "faBrickation: Fast 3D Printing of Functional Objects by Integrating Construction Kit Building Blocks," *Session: 3D Printing and Fabrication*, 3827-3834 (2014).

Mueller, S., et al., "Mechanical Properties of Parts Fabricated with Inkjet 3D Printing Through Efficient Experimental Design," *Materials and Design*, 86:902-912 (2015).

Murphy, S.V. and Atala, A., "3D Bioprinting of Tissues and Organs," *Nat. Biotech.*, 32(8):773-785 (2014).

Murray, C., "Smart Actuator Propels Hydraulic 'Beast of Burden'", Design News [online], Jun. 4, 2015 [retrieved Oct. 21, 2016]. Retrieved from the Internet URL: http://www.designnews.com/document.asp?doc_id=277754.

O'Donnell, J., et al., "A Review on Electromechanical Devices Fabricated by Additive Manufacturing," *J. of Manufacturing Science and Engineering*, pp. 1-45 (2015).

Palmer, J.A., et al., "Realizing 3-D Interconnected Direct Write Electronics within Smart Stereolithography Structures," *Proceedings of IMECE2005—2005 ASME International Mechanical Engineering Congress and Exposition*, pp. 1-7 (2005).

Park, S., et al., "Self-Assembly of Mesoscopic Metal-Polymer Amphiphiles," *Science*, 303: 348-351 (2004).

Peele, B.N., et al., "3D Printing Antagonistic Systems of Artificial Muscle Using Projection Stereolithography," *Bioinspir. Biomim.*, 10:1-8 (2015).

Popescu, G. A., et al., "Digital Materials for Digital Printing," *Soc. Imaging Sci. Tech.*, pp. 58-61 (2006).

Popescu, G.A., "Digital Materials for Digital Fabrication," Thesis submitted to Massachusetts Institute of Technology, pp. 1-53 (Aug. 20, 2007).

Proto3000: "3D Printed Snow Globe by Proto3000—Thingiverse," Retrieved from the internet: http://www.thingiverse.com/thing:225572, Retrieved on: Jan. 10, 2017.

Rost, A., and Schädle, S., "The SLS-Generated Soft Robotic Hand—An Integrated Approach Using Additive Manufacturing and Reinforcement Learning," IEEE: 215-220 (2013).

Rus, D. and Tolley, M.T., "Design, Fabrication and Control of Soft Robots," *Nature*, 521: 467-475 (2015).

(56) References Cited

OTHER PUBLICATIONS

Russo, A., et al., "Pen-On-Paper Flexible Electronics," *Adv. Mater.*, 23: 3426-3430 (2011).
Saari, M., et al., "Fiber Encapsulation Additive Manufacturing: An Enabling Technology for 3D Printing of Electromechanical Devices and Robotic Components," *3D Printing*, 2(1):32-39 (2015).
Safari, A., et al., "Solid Freeform Fabrication of Piezoelectric Sensors and Actuators," *J. Mat. Sci.*, 41: 177-198 (2006).
Saleh, E., et al., "3D Inkjet-Printed UV-Curable Inks for Multi-Functional Electromagnetic Applications," *Proceedings of ISFA2014*, pp. 1-5 (2014).
Sangani, K., "How to . . . Print Gadgets," *Engineering & Technology*, pp. 58-60 (2013).
Sharmis Passions, "Eggless Chocolate Cake—Moist Chocolate Cake Recipe (No eggs No butter)," http://www.sharmispassions.com/201 0/03/simple-moistchocolate-cakewith-no-eggs. html, pp. 1-37 (posted Mar. 27, 2010).
Sharon, E. et al., "The mechanics of non-Euclidean plates," *Soft Matter*, 6:5693-5704 (2010).
Sharon, Eran et al., "Leaves, Flowers and Garbage Bags: Making Waves," *American Scientist*, 92: 254-261 (2004).
Sharon, Eran., "Swell Approaches for Changing Polymer Shapes," *Science*, 335: 1179-1180 (2012).
Sitthi-Amorn, P., et al., "MultiFab: A Machine Vision Assisted Platform for Multi-Material 3D Printing," *ACM Transactions on Graphics*, Article No. 129, 34(4): 1-11 (2015).
Slightam, J.E. and Gervasi, V.R., "Novel Integrated Fluid-Power Actuators for Functional End-Use Components and Systems via Selective Laser Sintering Nylon 12," *23rd Ann Int Solid Freeform Fabrication Symp*: pp. 197-211 (2012).
Slotwinski, J.A., "Materials Standards for Additive Manufacturing," *National Institute of Standards and Technology (NIST), PDES, Inc. Workshop* (Mar. 14, 2013).
Snyder, T.J., et al., "3D Systems' Technology Overview and New Applications in Manufacturing, Engineering, Science, and Education," Mary Ann Liebert, Inc., 1(3):169-176 (2014).
Takatsu, H., et al., "Stress Analysis Method of U-Shaped Bellows and Its Experimental Verification," *Fusion Eng. & Des.*, 22: 239-250 (1993).
Tanaka, M., "Fatigue Life Estimation of Bellows Based on Elastic-Plastic Calculations," *Int. J. Pres. Ves. & Piping*, 2: 51-68 (1974).
Thomaszewski, B., et al., "Computational Design of Linkage-Based Characters," 9 pages (2014).
Thryft, Ann R., "3D Printing Now Good Enough for Final & Spare Car Parts," downloaded from www.designnews.com, 3 pages, (Jul. 22, 2016).
Tibbets, S. and Cheung, K., "Programmable Materials for Architectural Assembly and Automation," *Assembly Automation*, 32(3): 216-225 (2012).
Tibbits, S., "4D Printing: Self-Assembling Parts in Action at TED2013," by Stratasys Staff (Apr. 29, 2013).
Tibbits, Skylar J.E,. "4D Printing: Multi-Material Shape Change," *Architectural Design Journal* 84: 116-121 (2014).
Tibbits, Skylar., "Design to Self Assembly," *Architectural Design Journal* ,82(2): 68-73 (2012).
Tibbits, Skylar., "The Emergence of 4D Printing," TED Talk filed in Feb. 2012; transcript provided, 6 pages, video available at http://www.ted.com/talks/skylar_tibbits_the_emergence_of_4d_printing.html.
Tolley, M.T., et al., "A Resilient, Untethered Soft Robot," *Soft Robotics*, 1(3): 213-223 (2014).
Torrisi, F., et al., "Inkjet-Printed Graphene Electronics," *Am. Chem. Soc.*, 6(4): 2992-3006 (2012).
Tumbleston, J.R., et al., "Continuous Liquid Interface Production of 3D Objects," *Research Reports*, 347(6228): 1349-1353 (2015).
Tunisianswife, Easy Chocolate Bundt Cake Glaze (allrecipies.com accessed Jun. 6, 2016) http://all recipes. com/recipe/1 00335/easy -choco late-bu ndt -cake-glaze/.
Ultem®/PEI (Polyetherimide): Aetna Plastics, Accessed: Jun. 1, 2016.
Waheed, S., "3D Printed Microfluidic Devices: Enablers and Barriers," *Royal Society of Chemistry*, Lab on a Chip, 16: 1993-2013 (2016).
Walker, S.B. and Lewis, J.A., "Reactive Silver Inks for Patterning High-Conductivity Features at Mild Temperatures," *Am. Chem. Soc.*, 134: 1419-1421 (2012).
Wang, L., et al., "Robotic Folding of 2D and 3D Structures from a Ribbon," *IEEE International Conference on Robotics and Automation (ICRA)*, pp. 3655-3660 (2016).
Weiss, L., et al., "Shape Deposition Manufacturing of Wearable Computers," pp. 31-38 (1996).
Weiss, L.E., et al., "Shape Deposition Manufacturing of Heterogeneous Structures," *J. Manu. Sys.*, 16(4): 239-248 (1997).
Westbrook, K.K., et al., "A 3D finite deformation constitutive model for amorphous shape memory polymers: A multi-branch modeling approach for nonequilibrium relaxation processes," *Mechanics of Materials* 43: 853-869 (2011).
Whitney, J. P., et al., "A Low-Friction Passive Fluid Transmission and Fluid-Tendon Soft Actuator," 8 pages (2014).
Willis, K.D.D., et al., "Printed Optics: 3D Printing of Embedded Optical Elements for Interactive Devices," *UIST'12*, pp. 589-598 (Oct. 2012).
Wu, S-Y., et al., "3D-Printed Microelectronics for Integrated Circuitry and Passive Wireless Sensors," *Microsystems & Nanoengineering*, 1:1-9 (2015).
Xia, Fan and Jiang, Lei., "Bio-Inspired, Smart, Multiscale Interfacial Materials," *Advanced Materials* (20): 2842-2858 (2008).
Xie, T., "Tunable polymer multi-shape memory effect," *Nature Letters*, 464: 267-270 (2010).
Xu, S., et al., "Soft Microfluidic Assemblies of Sensors, Circuits, and Radios for the Skin," *Science*, 344: 70-74 (2014).
Yap, H.K., et al., "High-Force Soft Printable Pneumatics for Soft Robotic Applications," *Soft Robotics*, 3(3): 144-158 (2016).
Younsheng, L. and Shuiping, S., "Strength Analysis and Structural Optimization of U-Shaped Bellows," *Int. J. Pres. Ves. & Piping*, 42: 33-46 (1990).
Touloukian, Y.S. et al., Thermophysical Properties of Matter, vols. 12, Thermal Expansion Metallic Elements and Alloys (1975) (selected pages).
Touloukian, Y. S. et al., Thermophysical Properties of Matter, vol. 13, Thermal Expansion Nonmetallic Solids (1977) (selected pages).
Anatomy & Physiology (Open + Free), Unit 5: Muscular System, Module 16, "Skeletal Muscle Organ Anatomy" (Mar. 18, 2018).
Anatomy & Physiology (Open + Free), Unit 6: Muscular System, Module 17, "Muscle Fiber Organization" (Mar. 18, 2018).
Janbaz, et al., Programming the shape-shifting of flat soft matter: from self-rolling/self-twisting materials to self-folding origami, Materials Horizones, Issue 6, pp. 534-547, Aug. 2016.
Mao et al., "3D Printed Reversible Shape Changing Components with Stimuli Responsive Materials," Scientific Reports, Issue 6, Apr. 2016.
Raviv, et al., Active Printed Materials for Complex Self-Evolving Deformations, Scentific Reports, Issue 6, Dec. 2014.
"The New IEEE Standard Dictionary of Electrical and Electronics Terms," The Institute of Electrical and Electronics Engineers, Inc., IEEE Std 100-1992, Fifth Edition (pp. 338, 1009, 1064-1066, and 1293-1294), 1993.
Ackerman, E. "This self-poofing fabric transforms from t-shirt to parka," IEEE Spectrum, Mar. 18, 2017.
Advanced Functional Fabrics of America (AFFOA) Project Call 1.0 Full Proposal, Jun. 2017.
Auxetic 3D honeycomb, Retrieved from the Internet at: https://youtu.be/2WkFS1wYWLA>, 1 page (2015).
Bouten, S., "Transformable Structures and their Architectural Application," Universiteit Gent, Department of Structural Engineering, 196 pages (2015).
Cityzen smart shirt tracks your health, recharges during washing—https://newatlas.com/cityzen-smart-shirt-sensing-fabric-health-monitoring/30428/ (Feb. 3, 2014).
Clark, Liat, "How hair gel enables freeform 3D printing with an undo function," Retrieved from the Internet at: https://www.wired.co.uk/article/undo-3d-printing, Retrieved from the Internet on: Mar. 22, 2019, 11 pages.

(56) References Cited

OTHER PUBLICATIONS

Fairs, Marcus, Dezeen: "SCI-Arc student develops freeform 3D printing with "undo" function," Retrieved from the Internet at: https://www.dezeen.com/2013/07/23/sci-arc-student-develops-freeform-3d-printing-with-undo-function/, Retrieved from the Internet on: Oct. 8, 2019, 16 pages.
Farahi, B., "Caress of the Gaze: A Gaze Actuated 3D Printed Body Architecture," Oct. 2016, 10 pages. (2016).
Gatt, R., et al., "On the behaviour of bi-material strips when subjected to changes in external hydrostatic pressure," Scripta Materialia, 60: 65-67 (2009).
Ge, Q. et al., "Active origami by 4D printing," Smart Materials and Structures, 23(9): 1-15 (2014).
Ghiuzan. "Deployable Structures," Retrieved from the Internet at: https://youtu.be/E-IqvGAfQ68>, 1 page (2016).
Hajash et al., Large-Scale Rapid Liquid Printing, *3D Printing and Additive Manufacturing*, vol. 4, No. 3 (2017).
Hanuska et al., Smart Clothing Market Analysis (printed Aug. 20, 2019).
Hexoskin Smart Shirts—https://www.hexoskin.com/ printed Aug. 20, 2019.
Konaković et al. "Beyond developable: computational design and fabrication with auxetic materials," ACM Transactions on Graphics (TOG), vol. 35, Issue 4, Article No. 89 (Jul. 2016).
Meier et al., "An objective 3D large deformation finite element formulation for geometrically exact curved Kirchhoff rods," Computer Methods in Applied Mechanics and Engineering, Aug. 2014.
Men's Apollo Dress Shirt—White—Ministry of Supply, https://ministryofsupply.com/products/apollo-3-dress-shirt-white printed Aug. 20, 2019.
MIT Media Lab—Tangible Media Group—bioLogic—https://tangible.media.mit.edu/project/biologic/ printed Aug. 20, 2019.
Nayakanti et al. "Twist-coupled kirigami cellular metamaterials and mechanisms," arXiv:1707.03673v1 [physics.app-ph] (2017).
Neville, R.M. et al., "Shape morphing Kirigami mechanical metamaterials," Scientific Reports, 6, 12 pages (2016).
Nike HyperAdapt. Self-Lacing Shoes—https://www.nike.com/us/en_us/c/innovation/hyperadapt printed Aug. 20, 2019.
Papadopoulou et al., "Auxetic materials in design and architecture," Nature Reviews—Materials, 2:17078, Dec. 5, 2017.
Papadopoulou et al., "Heat-active auxetic materials," in Active Matter, MIT Press (2017).
Review: The Arrow Smart Shirt—https://www.livemint.com/Leisure/RTUZItGjlnEBfTdPTYJFEN/Review-The-Arrow-Smart-Shirt.html printed Aug. 20, 2019.
Rossiter, J. et al., "Shape memory polymer hexachiral auxetic structures with tunable stiffness," Smart Materials and Structures, 23: 1-11 (2014).
Santulli, C. & Langella, C. "Study and development of concepts of auxetic structures in bio-inspired design," Int. J.Sustainable Design, 3:1 (2016).
Tabuchi, H. "Products and competition stretch market for 'athleisure' clothing," The New York Times, Mar. 25, 2016.
"Suspended Depositions," NSTRMNT, Retrieved from the Internet at: nstrmnt.com/#/suspended-depositions/, Retrieved from the Internet on: Oct. 8, 2019, 5 pages.
Tu Delft, "4D Printing for Freeform Surfaces: Design Optimization of Origami Structures," Retrieved from the Internet at: https://youtu.be/vQB49vNFu14>, 1 page (2015).
Xu, H., "Structurally Efficient Three-dimensional Metamaterials with Controllable Thermal Expansion," Scientific Report, 6, 8 pages (2016).
Zhang, Q. et al., "Pattern Transformation of Heat-Shrinkable Polymer by Three-Dimensional (3D) Printing Technique," Scientific Reports, 5: 1-6 (2015).
Zhang, Q. et al., "Smart three-dimensional lightweight structure triggered from a thin composite sheet via 3D printing technique," Scientific Reports, 6, 8 pages (2016).

\* cited by examiner

Method 1:

1: if Small Strain then

2:     Choose desired $E'$, $E''$ or $tan(\delta)$

3:     Compute $P_I$ numerically from Equation 5 and Table II

4: else if Large strain then

5:     Choose desired $e^*$ or $F_I$

6:     Compute $P_I$ numerically from Equation 6

7: end if

8:     Generate a desired object shape using CAD tools and export an STL file

9:     $M(v) \leftarrow$ *Algorithm* 2(*STL*, $P_I$)

10:     Print $M(v)$

FIG. 10

Method 2: Calculate $M(v) \in R^3$, given $STL$ and $P_i$

1:     for all voxels $v$ in M do

2:         if $v$ is inside STL then

3:             $r \leftarrow$ random $\in [0,1]$

4:             if $r > P_i$ then

5:                 $M(v) \leftarrow$ *Material A*

6:             else

7:                 $M(v) \leftarrow$ *Material B*

8:             end if

9:         else

10:            $M(v) \leftarrow$ *Empty*

11:         end if

12:    end for

FIG. 11

ADDITIVE MANUFACTURING OF VISCOELASTIC MATERIALS

RELATED APPLICATION

This application claims the benefit of U.S. Provisional Application No. 62/336,803, filed on May 16, 2016. The entire teachings of the above application is incorporated herein by reference.

GOVERNMENT SUPPORT

This invention was made with government support under CCF-1138967 and U.S. Pat. No. 1,226,883 from National Science Foundation. The government has certain rights in the invention.

BACKGROUND

Impact protection and vibration isolation are an important component of the mobile robot designer's toolkit; however, current damping materials are available only in bulk or molded form, requiring manual fabrication steps and restricting material property control.

Robots have to cope with various situations that require damping in locomotion and manipulation. For locomotion, bouncing can help propel the robot to the next step [1], although in other applications, landing with minimal rebounds ("sticking the landing") is important. When manipulating vibrating tools, it is useful to absorb vibrations of the tools.

While soft robots can sustain large falls due to their light weight and lack of rigid structure, hybrid robots and rigid robots require some form of protection from falls.

SUMMARY

Described herein is a method of forming a structure having viscoelastic properties. The method can include depositing a layer of droplets of a solidifying material and a non-solidifying material, the droplets being deposited according to an occupancy matrix specifying voxels for the solidifying and non-solidifying materials, the solidifying and non-solidifying material being interspersed within the occupancy matrix; exposing the droplets of solidifying material to ultraviolet radiation to cure the solidifying material; and repeating the depositing and expositing to deposit and cure additional layers of droplets of solidifying and non-solidifying materials, thereby forming the structure having viscoelastic properties. In some embodiments, the occupancy matrix is generated by a probabilistic function, such as a random function. The probabilistic function can be based on a prescribed percent liquid in a region of the structure. The percent liquid can be based on a predetermined physical property of the structure, such as storage modulus, loss modulus, or ratio of storage modulus to loss modulus. The structure can have isotropic mechanical properties. In some embodiments, the structure has anisotropic mechanical properties, such as when the percent liquid varies as a function of position or when the percent liquid is radially symmetric in two dimensions and varying a third dimension (e.g., height). In other embodiments, the occupancy matrix can be generated deterministically.

In some embodiments, each dimension of the voxels can be between 5 µm and 50 µm. In some embodiments, 50% to 99% of the voxels can be solidifying material. In other embodiments, 64% to 96% of the voxels are solidifying material. In some embodiments, the occupancy matrix has three dimensions. In other embodiments, the occupancy matrix has two dimensions. In some embodiments, the occupancy matrix can specify a region of the object.

Some embodiments can include depositing a second solidifying material. Other embodiments can include depositing a second non-solidifying material. In some embodiments, the occupancy matrix for a subsequent layer is generated while depositing the layer of droplets of solidifying and non-solidifying materials.

Also described herein is a deformable, opaque, photopolymerized acrylate foam having interspersed solidified and non-solidified material. In some embodiments, the solidified and non-solidified material can be interspersed according to probabilistic function. In other embodiments, the solidified and non-solidified material can be interspersed according to deterministic function. The foam can be an open cellular foam or a closed cellular foam filled with liquid. In some embodiments, the foam has at least 25% void space after the removal of a non-solidified material.

Described herein are new methods of making materials having viscoelastic properties. In some embodiments, the viscoelastic properties can be specified, e.g., in software, and realized automatically. In other words, the mechanical properties can be programmed. In some of the applications described herein, we then apply this approach to building jumping robots whose bodies can absorb the forces generated upon contact with the ground. Embodiments described herein are 3D printing approaches that combines the printing of solidifying materials with non-solidifying materials (e.g., liquids) to achieve materials with graded viscoelastic properties. Embodiments of the viscoelastic materials have a storage modulus $E' \in \{0.1, \ldots, 1\}$ MPa and a tangent delta $\tan(\delta) \in \{0.2, \ldots, 0.9\}$, at 1 Hz. Described herein is a data-driven approach to develop a model for the placement of solidifying and non-solidifying (e.g., liquid) droplets deposited by a 3D inkjet printer that can achieve a desired mechanical property within this range. Also described herein is measuring the mechanical properties of these printed materials. Also described herein are applications of these new materials to create a new jumping cube robot that can "stick the landing".

Described herein are methods for materials having viscoelastic properties. In some embodiments, data-driven models that describe the mechanical properties of these materials are also described, as well as methods for generating an occupancy matrix based on the data models. Also described herein are methods for generating the printable material design files. Also described herein are measurements that characterize these materials in dynamic low- and high-strain regimes.

Described here are methods for 3D printing viscoelastic materials, including viscoelastic materials having specified material properties. The methods allow arbitrary net-shape material geometries to be rapidly fabricated and enable continuously varying material properties throughout the finished part.

In some applications, robot designers can tailor the properties of viscoelastic damping materials in order to reduce impact forces and isolate vibrations. In other applications, the material can be used to create jumping robots with programmed levels of bouncing.

Applications of our embodiments permit roboticists to use 3D printers to create custom viscoelastic materials to protect robots from sudden drops and impacts by tuning the elastic modulus to the mass and size of their robot.

While several of the embodiments described herein are applicable to robotics, the viscoelastic materials can be used in a variety of difference fields and circumstances.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A is a graph of E' vs. frequency. FIG. 1B is a graph of E" vs. frequency. FIG. 1C is E' at 1 Hz vs. percent liquid. FIG. 1D is a graph of E" at 1 Hz vs. percent liquid. FIG. 1E is a graph of n of E' vs. percent liquid. FIG. 1F is a graph of n of E" vs. percent liquid. FIG. 1G is a graph of tan δ at 1 Hz vs. percent liquid. FIG. 1H is a graph of tan δ at different frequencies vs. percent liquid. The storage modulus E' (FIG. 1A) and loss modulus E" (FIG. 1B) can be modeled as a power law function of frequency for all of the material concentrations tested. The power exponent n for the storage modulus (FIG. 1E) loss modulus (FIG. 1F) can be fit as two different models which switch at 25% concentration. The value of E' at 1 Hz (FIG. 1C) and E" at 1 Hz (FIG. 1D) can be modeled as a function of percentage liquid. The tan δ at 1 Hz (FIG. 1G) can be modeled and applied over the range of frequencies (FIG. 1H).

FIG. 2A is a graph of coefficient of restitution vs. percent liquid vs. impact energy. FIG. 2B is a graph of transmitted force vs. percent liquid vs. impact energy.

FIG. 5A: t=0 second. FIG. 5B: t=0.15 seconds. FIG. 5C: t=0.29 seconds. FIG. 5D: t=0.50 seconds.

FIG. 7A: Isolating from a moving mount/base. FIG. 7B: Minimizing disturbance distance due to an external force.

FIG. 10 is a first example method that may be employed by an embodiment of the invention.

FIG. 11 is a second example method that may be employed by an embodiment of the invention.

DETAILED DESCRIPTION

Figure 1A:
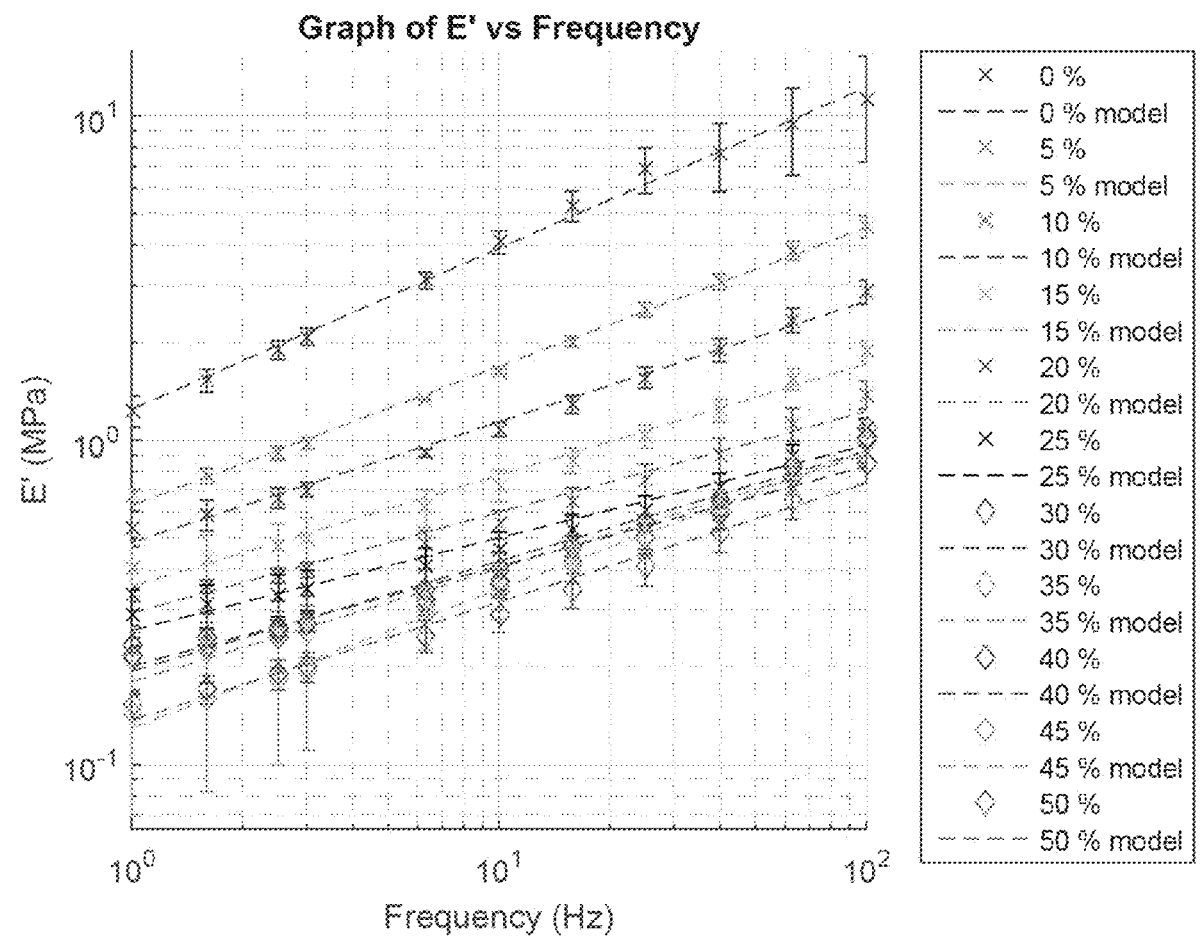
FIGS. 1A-H are graphs showing that the complex modulus of the material varies as a function of liquid percentage.

A description of example embodiments follows.

Soft and hard jumping robots have been made for a wide variety of purposes, but none has used custom viscoelastic damping to improve their performance and durability. The "Sand Flea" robot launches itself over obstacles with a pressurized air cannon, and uses its rigid plastic wheels to absorb the impact [2]. Others, such as the Mowgli, use an articulated spring system on legs to absorb the impact forces [3]. The Jollbot encloses an entire lightweight robot into a much larger cage, limiting the space it can fit into and requiring it to operate in a smooth environment to ensure nothing penetrates the cage [4]. Soft robots can sustain large falls and hard impacts due to their light weight and lack of rigid structure [5]. Their elastomeric bodies can easily deform without damage but can flail on impact causing them slide off of their targets. [6]

Power sources such as motors and pumps can shake a system, adding unwanted noise and dynamics [7], [8], [9], [10], [11]. This can lead robots to be difficult to control. Traditionally, discrete spring mass damper systems have been used to adjust vibration responses in larger structures [12]. Others have used active acoustic cancellation to eliminate vibrations in structures [13]. However, simple passive damping materials are the most commonly used and robust approach to reduce vibrations [14], [15], yet these materials are only commercially available with specific material properties and dimensions.

What would be useful are improved methods of making materials that can reduce vibration and cushion impact, for use in robotics.

Dampers play a useful role in nearly all mechanical designs, such as in robots, and there are applications for customizable materials that can be programmed in both shape and material property to quickly accommodate the requirements of specific robot designs.

Dampers are energy-absorbing elements that convert mechanical work into heat, dissipating that thermal energy in the ambient environment. Energy dissipating dampers can be implemented in various ways through the use of liquid (hydraulic), gas (pneumatic), and viscoelastic (rubber, plastic, foam) materials. Dampers based on gasses or liquids force the working fluid through an orifice, causing flows that generate heat. Because they must constrain the working fluid, devices based on this principle usually contain multiple parts including sliding seals and cylinders, which contribute to component cost and size [16]. In contrast, viscoelastic materials are inherently dissipative: they have a stress-strain relationship that exhibits a phase lag, creating a hysteretic loop [17]. This relationship can be seen in Equation 1, where σ is stress, ε is strain, and the Young's modulus, $E^*$, is represented as a complex number. $E'$ represents the in-phase response of the material and is known as the storage modulus. It is the component of $E^*$ that stores and releases energy when compressed. $E''$ is the loss modulus which represents the out of phase dissipative response of the material to deformation.

$$\sigma = \varepsilon E^*, E^* = |E' + iE''| \quad (1)$$

Viscoelastic materials are widely used as dampers because they are simple, compact, inexpensive, and widely available; most natural rubbers are viscoelastic. As bulk materials, they can be shaped into the desired net geometry by conventional methods (casting, cutting/stamping, extruding, heat-forming, molding etc). However, this simplicity comes at a cost. The tooling required to create the desired geometry can be time-consuming to setup, and the materials have isotropic material properties; if regions with varying stiffness or damping are desired, they must be implemented with physically different pieces of material, placed adjacent to each other.

Additive manufacturing (3D printing) provides a means to overcome these limitations. By providing a mechanism for simultaneously depositing different materials (with different mechanical properties) within a design, multi-material additive manufacturing allows computer code to specify the mechanical properties of every region of a part using a new composite "Programmable Material". This new material can have mechanical properties that vary continuously as a function of position by controlling the proportions of each constitutive element.

Overview of Methods of Making Viscoelastic Structures

We recently showed that a commercially available inkjet 3D printer could be modified to simultaneously print with different solid and liquid materials. We used the liquid material, within a rigid shell, as a force-transmitting element via hydraulic pressure [18]. In the methods described herein, the printer is similarly configured (Objet Connex 260, Stratasys Corp.), but the methods described herein employ continuous distributions of a flexible material (TangoBlack+, Stratasys Corp.) and a liquid material (Model Cleaning Material, Stratasys Corp.) by depositing adjacent, interspersed droplets of each material type. Multi-material objects fabricated in this manner are specified by an occupancy matrix in $R^3$. The entries of this matrix correspond to the voxels of the part that will be built. Materials with mechanical properties that differ from the base materials (in this case, TangoBlack+ and liquid) can be specified by assigning different fractions of randomly chosen voxels to one material type or the other, assuming that the chosen voxels lie within the bounding surface of the part (STL file) that will be fabricated, according to Method 2. This approach allows customized printed viscoelastic materials (PVMs) to be designed and fabricated using modifications of an existing toolset.

This method is used according to Method 1. We provide an overview here; specific examples of impact-absorbing applications and vibration isolation are shown in the Applications section. First, the designer determines whether the viscoelastic material is likely to be used in small ($\varepsilon < 0.01$) or large deformations ($\varepsilon > 0.01$). Vibration damping applications will typically fall into the former category, while impact absorbing cases fit the latter. Next, the desired material property is chosen, and the liquid percentage that determines it is obtained in the following way.

In the small deformation regime ($\varepsilon < 0.01$), $E^*$ is a complex function of frequency and liquid percentage, as shown in Equation 2. $E^*$ can be expanded, using the parameters and models from Table 2. Note that when expanding Equation 5, the constant values a, b, c, and d are model-specific and must be read from the corresponding row of the table. Similarly, the models for $n_1$ and $n_2$ are specific to the liquid concentration used. Equation 5 cannot be algebraically solved for $P_1$, but can be numerically evaluated across the range of its inputs $\omega \in [0, \ldots, 2\pi*100]$, $P_1 \in [0, \ldots, 50]$, and then satisfying liquid percentages can be read from a lookup table.

We chose to characterize the coefficient of restitution for impact applications (large deformation regime, $\varepsilon > 0.01$), since $e^*$ is defined as the ratio of energy in an object before and after a collision. Equation 6 shows the model for PVMs in this application, which may be evaluated to return the required $P_1$ for a desired $e^*$.

The liquid percentage is used, along with a user-generated object outline STL file, as an input to Method 2, yielding the occupancy matrix M(v). M(v) is an element-by-element list of all voxels in the printer's build envelope, and identifies which material type will be deposited in each possible voxel. The voxels define the minimum resolution of the printer. Finally, M(v) is converted into the surface files (for instance one STL file per resulting viscoelastic material) used to print the part. In other embodiments, as described herein, the occupancy matrix M(v) can specify a single two-dimensional layer of a structure, such that multiple occupancy matrices M(v) can collectively specify a complete part.

Embodiments of methods described herein use $P_1$ as the only determining property of the printed material. In one embodiment, Method 2 randomly assigns a certain percentage of the voxels in the part to the liquid, and the rest to the solid. This approach produces a material with isotropic mechanical properties. In other embodiments, variations of Methods disclosed herein yield voxel distributions having anisotropic material properties. For example, a linear gradient across a part that varies the percentage of liquid as a function of position according to the function $P_1 = a\,x + b$. As another example, $P_1 = \sqrt{x^2 + y^2} + z$ to make a part that is radial symmetric in the plan but varies with height.

TABLE 1

Variables and Definitions

| Variable | Description |
|---|---|
| $E^*$ | Complex Young's Modulus |
| $E'$ | Storage Modulus |
| $E''$ | Loss Modulus |

TABLE 1-continued

Variables and Definitions

| Variable | Description |
| --- | --- |
| σ | Stress |
| ε | Strain |
| $E_0$ | Impacter energy before collision |
| ΔE | Change in impacter energy |
| e* | Coefficient of restitution e* ≡ ΔE/E |
| $F_t$ | Peak transmitted force |
| tan(δ) | tan(δ) ≡ E"/E' |
| ω | Frequency (rad/sec) |
| i | Imaginary number i ≡ $\sqrt{-1}$ |
| $P_l$ | Percent liquid by volume in a material $P_l \in [0, \ldots, 100]$ |
| a, b, c, d | Model-fit constants |
| $A_0$ | Undeformed cross-sectional area of sample |
| $L_0$ | Undeformed length of sample |
| M(v) | Occupancy matrix defining voxel material assignments in the printed part |

In other embodiments, the percent liquid can be determined based on a predetermined physical property of the structure, as described more fully with respect to FIGS. 1A-H. For example, predetermined physical properties can include the storage modulus (E'), loss modulus (E"), or ratio of storage modulus to loss modulus (tan(δ)). Thus, the appropriate percent liquid can be determined based on predetermined, or selected, physical properties desired in the resulting structure. Thus, in some embodiments, the position of the voxel can be mapped to a desired percentage liquid at that position, while in other embodiments, the position of the voxel can be mapped to desired material properties, from which a corresponding percentage liquid is determined.

The methods can also include depositing a second solidifying material, such as a support material, which can optionally be removed. The second solidifying material can be deposited to support the first solidifying material and the non-solidifying material when forming complex geometries. For example, the second solidifying material can provide a platform for overhanging geometries on subsequent layers during bottom-up, layer-by-layer fabrication; weak solidifying materials that can be washed away or dissolved are typically used as support.

An occupancy matrix is a mapping between points in physical 3D space (X,Y,Z) to materials that will be deposited at that point in 3D space such that the solidifying and non-solidifying materials are interspersed with each other. Each index in the matrix represents a point in 3D space, the value at that index represent the material to be deposited at that 3D point. The matrix may be a cubic, rectilinear, or any other regular tiling of space. The matrix itself may be one-, two-, or three-dimensional. The occupancy matrix can represent an entire print job, of a part of a 3D print job. The occupancy matrix can be generated during the print, or can be pre-calculated before the print. In some embodiments, the occupancy matrix can be generated by mapping the positions of voxels into probabilistic functions that use a pre-assigned probability distribution to determine if a solidifying or non-solidifying material will be present at that point in the print job. In some embodiments, a probabilistic distribution can utilize Method 2.

In other embodiments, an occupancy matrix can be generated by mapping positions in 3D space into a deterministic periodic function to determine a periodic deposition of solidifying and non-solidifying materials. An example of a deterministic periodic function is using a modulus based on the index (I) in the occupancy matrix. For a desired percentage liquid, the nearest integer N would be N=int(100/$P_l$). Then the system would assign non-solidifying material would be posited at indexes where I % N=0, where % is the modulus operator. Another deterministic period method is having a 3D or 2D value matrix convolve with the desired parts STL to generate an occupancy matrix. The 3D or 2D value matrix is smaller than the final occupancy matrix and is pre-assigned with a pattern of two or more values. One value would be assigned to the solidifying material and another value would be assigned to a non-solidifying material. That pattern in the value matrix would then be repeated inside of the occupancy matrix producing a periodic occupancy matrix.

Probabilistic and deterministic approaches to generating an occupancy matrix can provide different advantages and benefits. For example, generating an occupancy matrix by a probabilistic function likely improves homogeneity in the resulting structure compared to a deterministic approach because a probabilistic function avoids periodicity in the structure, thus creating an aperiodic structure. In contrast, deterministic approaches that follow patterns produce structures with a periodicity and less distributed pore size. Additionally, a probabilistic approach produces a distribution of cell sizes. However, generating an occupancy matrix by a deterministic approach also improves mixing and conveys different features, such as a uniform cell size, which can be useful in making filters or membranes As used herein, solidifying materials refer to materials that solidify in accordance with performing the methods described herein. For example, solidifying materials include materials that solidify due to a curing process, whereby the solidifying material polymerizes to yield a solid material. In some embodiments, the solidifying material polymerizes upon exposure to UV light. Such solidifying materials are readily available for sale from Stratasys Ltd., Eden Prairie, Minn., USA, for use in 3D printers sold by Stratasys. Other solidifying materials include plastics that can be heated to a liquid phase and that change to a solid upon cooling to room temperature. The particular solidifying materials described herein are commercially available, though the principles are generally applicable to other types of solidifying materials.

As used herein, non-solidifying materials refer to materials that do not solidify at room temperature. Examples include polyethylene glycol, water, and many alcohols. While these liquids may freeze if cooled to a low enough temperature, they are considered non-solidifying within the normal operating temperature range for 3D printers. For example, 3D printing is typically conducted at room temperature, while polyethylene glycol, water, and many alcohols freeze at temperatures below room temperature, and thus they are non-solidifying under ordinary use conditions. The particular non-solidifying materials described herein are commercially available (e.g., in the form of a cartridge of cleaning fluid for use in a commercially-available 3D printer), though the principles are generally applicable to other types of non-solidifying materials.

Modeling

The 3D printer deposits droplets of UV-cured resin creating voxels that are approximately 30 μm×30 μm×40 μm (X, Y, Z). When non-curing liquids and UV-curing materials are in close proximity, as they would be during the fabrication of a PVM with high liquid concentration, pre-curing mixing between these materials is likely to occur. It is also likely that some fraction of the liquid is absorbed into the solid soon after printing. Therefore, although the 3-dimensional pattern of voxels is prescribed by M(v), the microscopic structure of the 3D printed materials realized by this method is currently unknown. Additionally, modeling viscoelastic materials with a bottom-up approach, based on finite elements or lumped parameters is an active area of research and is application-specific [19], [20]. Though developing a material model from first-principles would be an interesting area of research, we chose to characterize the achievable material properties experimentally, and used those measurements to build phenomenological models of the material for impact- and vibration-absorbing applications (see Table 2 and Equations 2-6).

Modeling: DMA Measurements

In order to characterize the material's response to vibrations, we tested printed samples on a TA Q800 Dynamic Mechanical Analyzer (DMA). Five samples of each concentration were printed on a Connex 260 3D printer for testing. We 3D printed samples at 0 through 50% liquid concentrations in increments of 5%. Each sample was 10 mm in diameter and 10 mm tall, in accordance with DIN 53 513. The samples were tested in accordance with ASTM standard D5992-96. Test frequencies were varied from 1 Hz to 100 Hz on an evenly spaced log scale of frequencies with 10 frequencies per decade. Each sample was compressed 75 μm at 22° C.

Figure 1B:
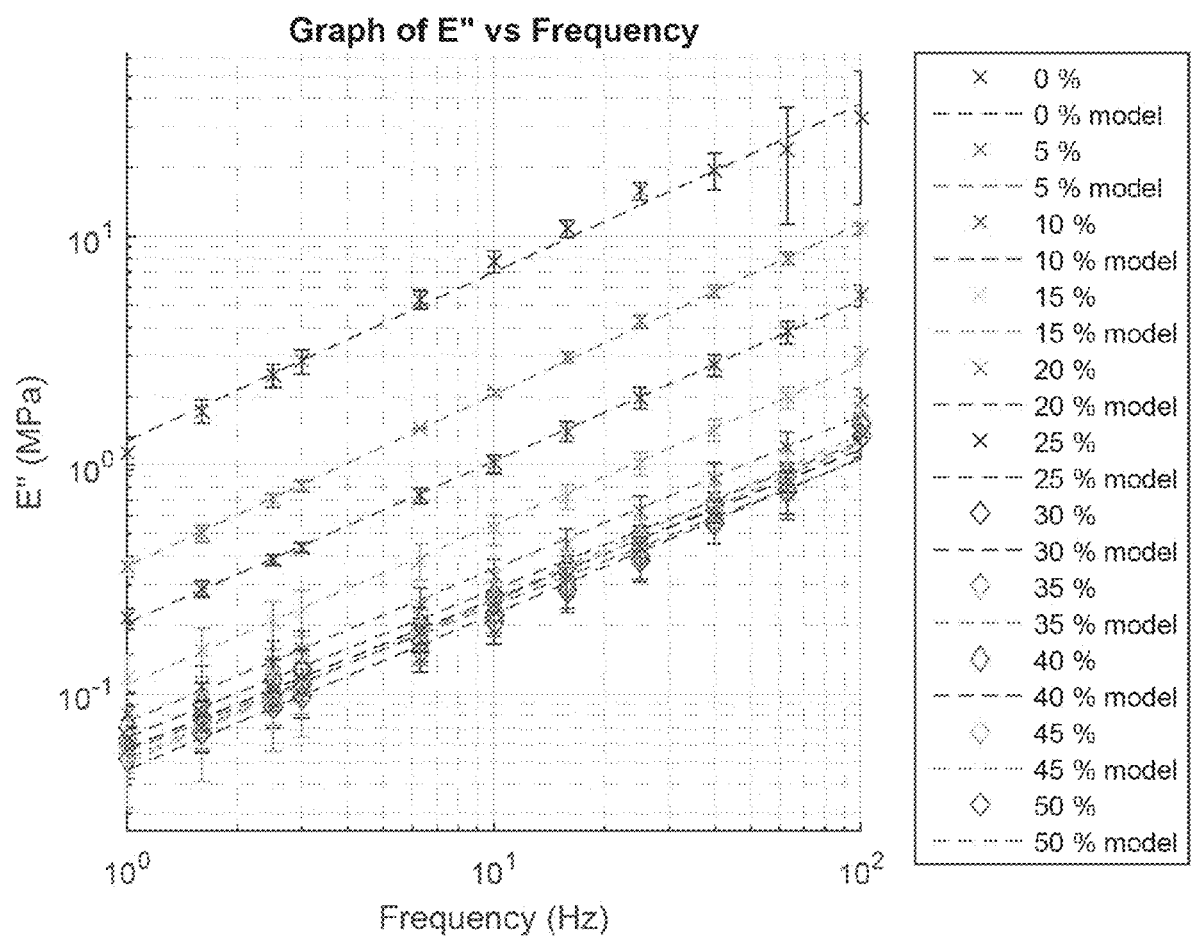
Figure 1C:
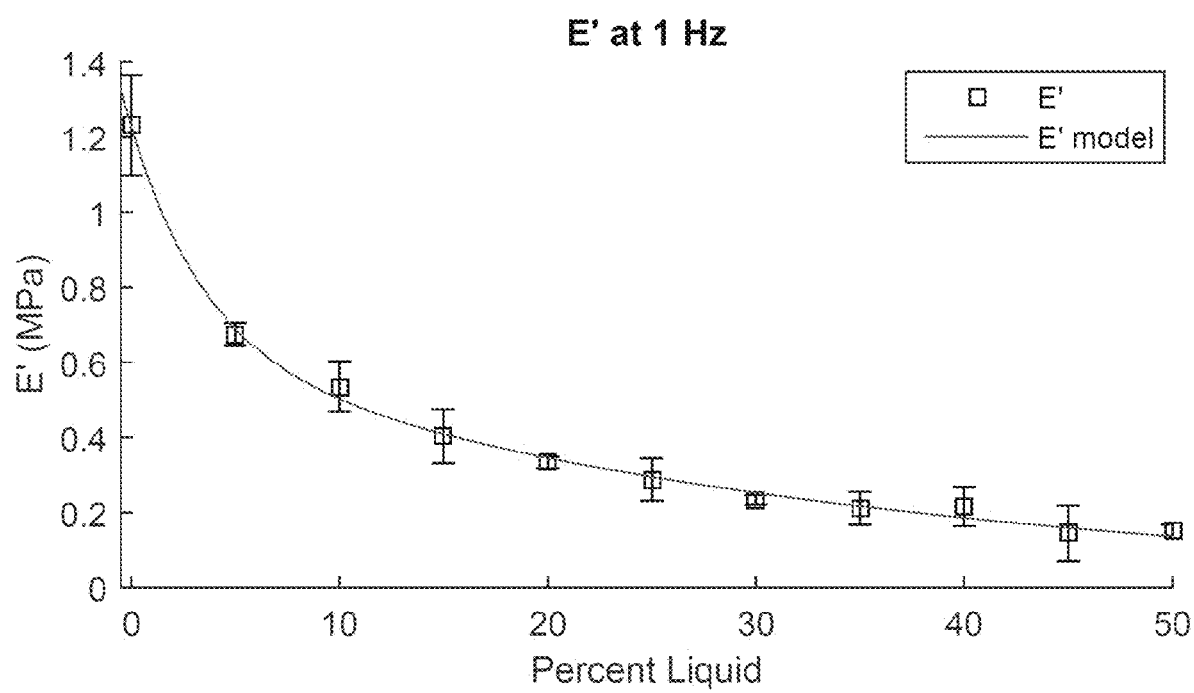
Figure 1D:
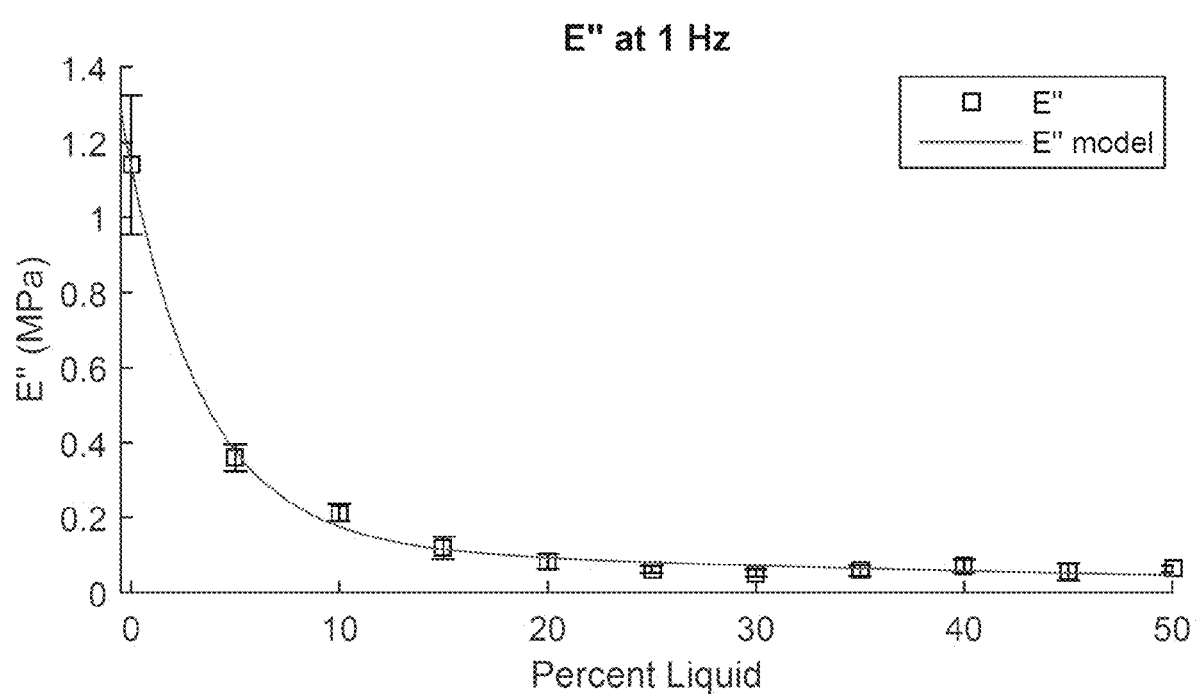

As seen in FIGS. 1A and 1B the storage modulus E' and loss modulus E" lie along lines in a log log plot for all of the frequencies and liquid concentrations tested. This clearly shows that there is a power law relationship of the form of Equation 2. Each line varies in slope, indicating that there is a different power law exponent for each of the concentrations of liquid. The higher slopes of the fits in FIG. 1B shows that there is a faster increase in E" with frequency than E'. If we can model E' and E" at 1 Hz, and the power law exponents $n_1$ and $n_2$, as a function of the liquid concentration, we are able to predict the value of E* at any frequency greater than 1 Hz. FIGS. 1C and 1D show that both moduli can be fit to a model in terms of the liquid concentration. The model is a function of $P_l$ of the form $ae^{bP_l}+ce^{dP_l}$. The coefficients a, b, c, d can be found in Table 2, as can $n_1$ and $n_2$.

$$E^*(\omega,P_l)=E'(\omega,P_l)+i^*E''(\omega,P_l) \quad (2)$$

$$E'(\omega,P_l)=E'|_{1\,Hz}*\omega^{n_1} \quad (3)$$

$$E''(\omega,P_l)=E''|_{1\,Hz}\omega^{n_2} \quad (4)$$

$$E^*(\omega,P_l)=E'|_{1\,Hz}*(\omega^{n_1}+i^*\tan(\delta)|_{1\,Hz}\omega^{n_2}) \quad (5)$$

Figure 1E:
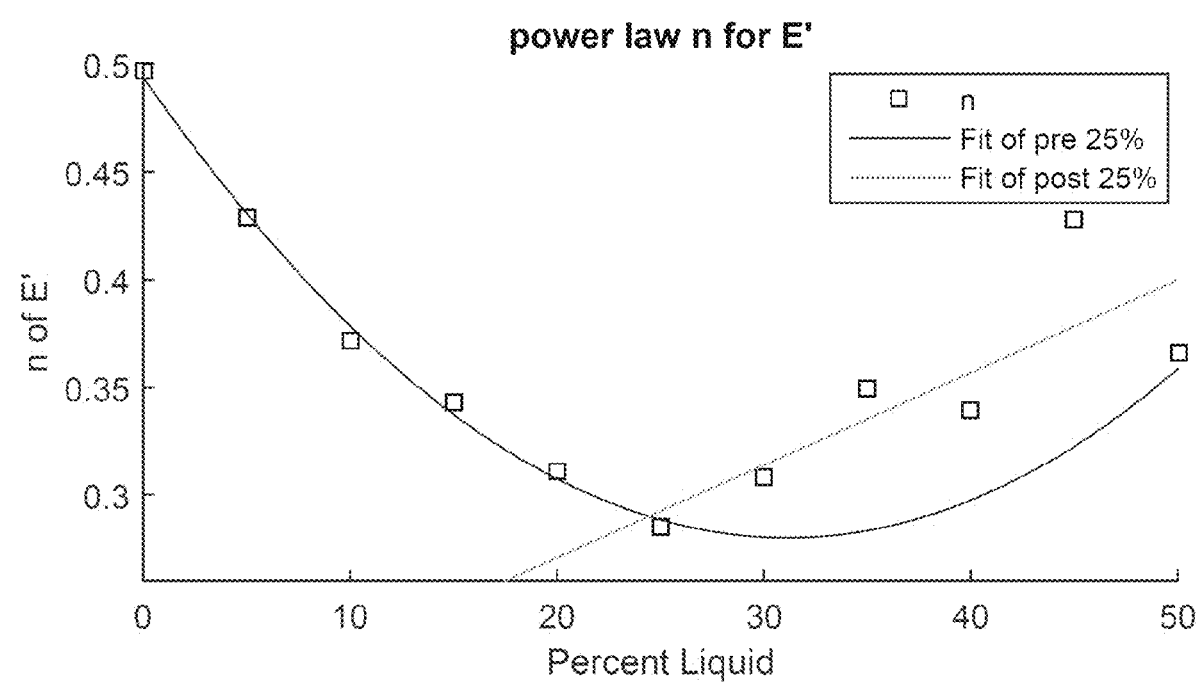
Figure 1F:
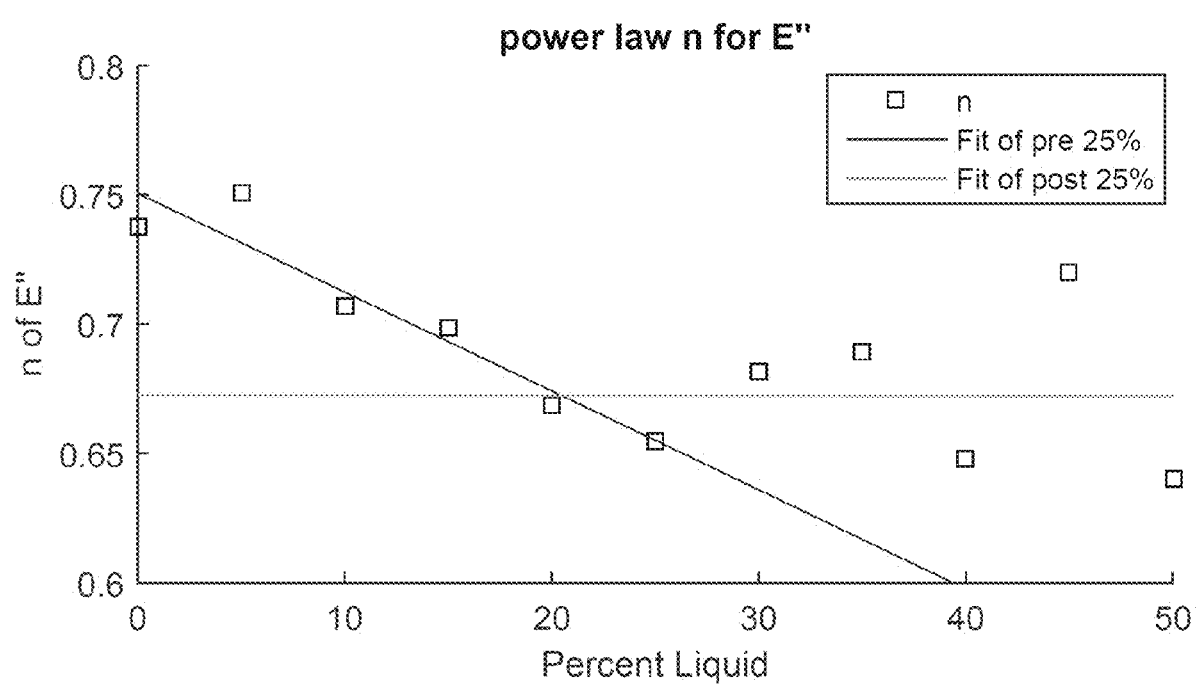

We can see in FIGS. 1E and 1F that the relationship of $n_1$ and $n_2$ with $P_l$ are modeled differently for concentrations below 25% and above 25%. This suggests a physical change in the material at 25%. Modeling the power terms as linear (E") or quadratic (E') with $P_l$ when $P_l \leq 25\%$, produces an acceptable fit, while the linear model for behavior above 25% does not hold. The coefficients of the models can be seen in Table 2. In the sub 25% range, we have an accurate model of the material's complex modulus as a function of liquid percentage.

TABLE 2

The physical properties of the complex modulus $E^*$ can be modeled as a function of $P_l$

| Physical Property | Physical Property Model | a | b | c | d | Range of $P_l$ |
|---|---|---|---|---|---|---|
| $E'\|_{1\,Hz}$ | $ae^{bP_l} + ce^{dP_l}$ | 0.595 | −0.282 | 0.635 | −0.031 | 0%–50% |
| $E''\|_{1\,Hz}$ | $ae^{bP_l} + ce^{dP_l}$ | 1.00 | −0.272 | 0.135 | −0.021 | 0%–50% |
| $\tan(\delta)\|_{1\,Hz}$ | $ae^{bP_l} + ce^{dP_l}$ | 0.832 | −0.118 | 0.085 | 0.032 | 0%–50% |
| $n_1$ of E' | $aP_l^2 + bP_l + c$ | 2.21e$^{-4}$ | −1.37e$^{-2}$ | 0.494 | — | 0%–25% |
| $n_2$ of E" | $aP_l + b$ | −3.82e$^{-3}$ | 7.51e$^{-1}$ | — | — | 0%–25% |
| $n_1$ of E' | $aP_l + b$ | 4.30e$^{-3}$ | 1.85e$^{-1}$ | — | — | 25%–50% |
| $n_2$ of E" | $aP_l + b$ | 0 | 6.73e$^{-1}$ | — | — | 25%–50% |

We observed under optical magnification that at liquid concentrations below 25%, PVMs look like a single soft material, while at concentrations above 25% liquid films form on their surface and the PVMs slowly leak liquid over time. Without wishing to be bound by theory, liquid concentrations higher than 25% PVMs form an open-cell foam, providing an exit path for the deposited fluid, thereby explaining the different models required above and below the 25% concentration. The 3D printing process contributes to formation of a UV-cured cellular foam because layers are cured prior to deposition of successive layers, thereby curing the solidifying material and containing the non-solidifying material within the cellular structure.

From these results we can conclude that printable viscoelastic materials (PVM) can be modeled as a soft glassy material (SGM) because the storage and loss moduli of SGM materials have a power law relation with frequency [21]. The high value of $n_1$ and $n_2$ (see Table 2) also indicate that the materials should not have a significant aging effect [21].

Figure 1G:
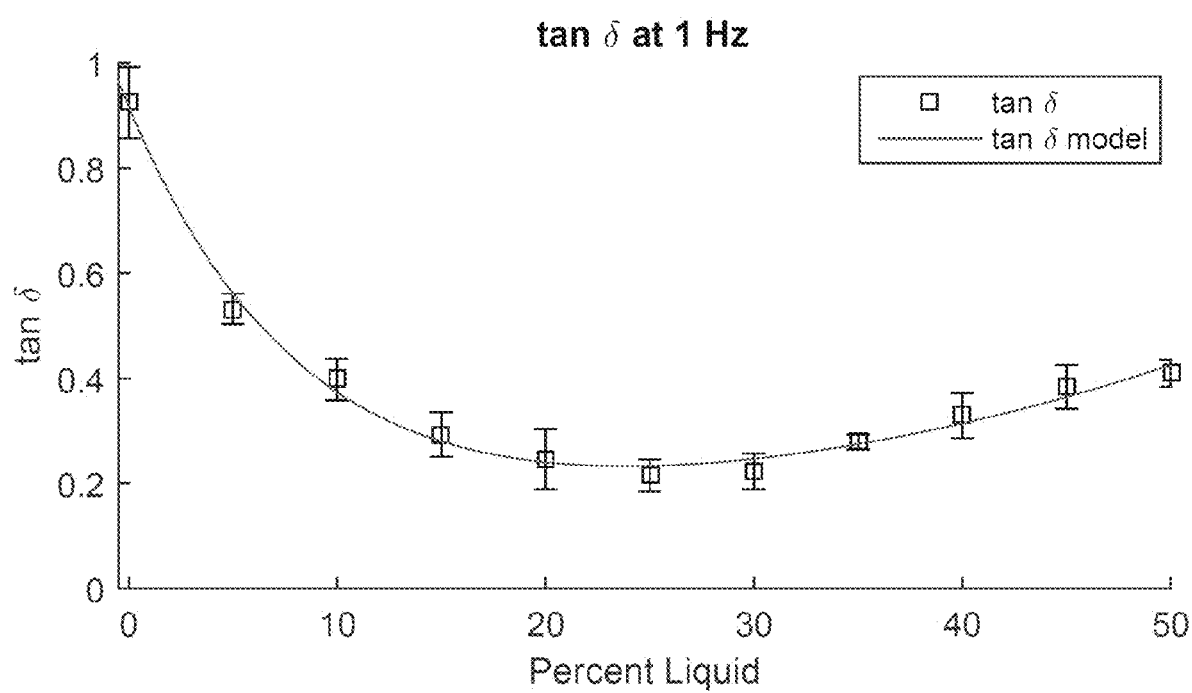
Figure 1H:
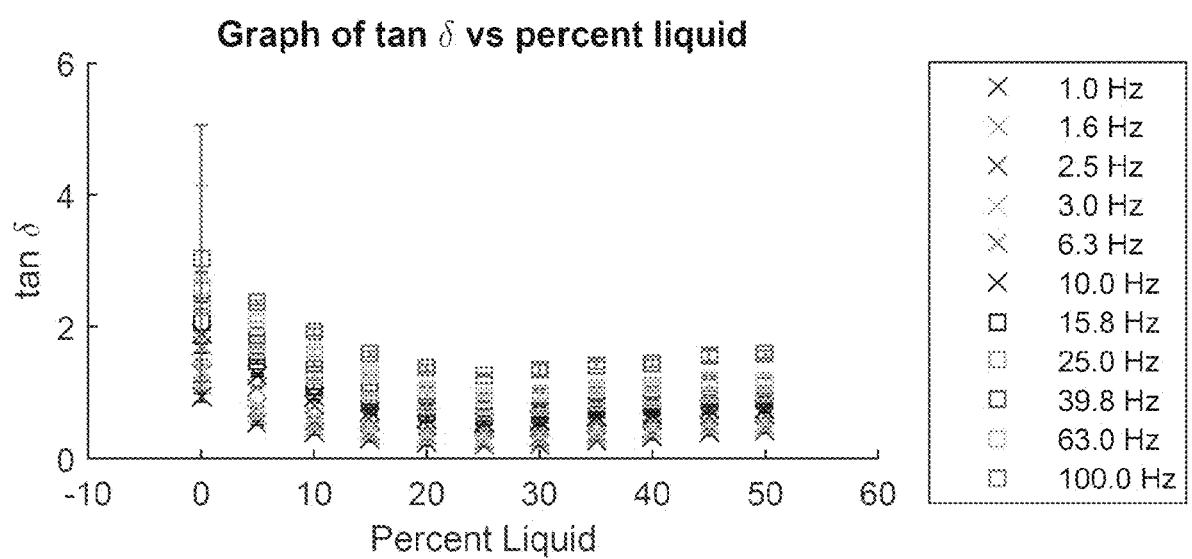

In order to simplify calculations it is convenient to replace $E''|_{1\,Hz}$ with $E'|_{1\,Hz}*\tan(\delta)|_{1\,Hz}$. This allows us to combine Equations 2, 3, and 4 to get Equation 5. FIG. 1G shows that $\tan(\delta)|_{1\,Hz}$ can be modeled by a double exponential function as well.

Based on FIGS. 1A-H and Equations (2) through (5), the percent liquid ($P_l$) can be determined for desired material characteristics. Using different solidifying and non-solidifying materials will lead to different models for the physical properties, but the principle is the same in that an appropriate percent liquid can be determined based on the desired predetermined physical properties of the viscoelastic material.

Modeling: Impact Measurements

Figure 2A:
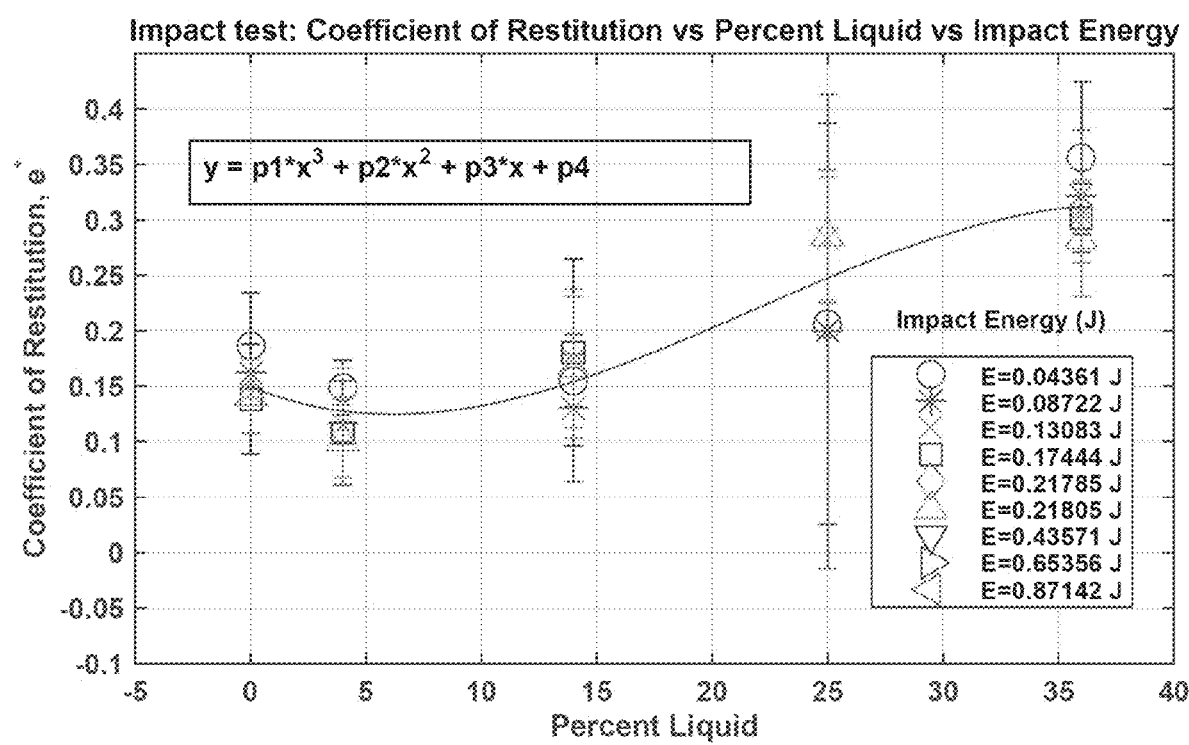
FIGS. 2A-B are impact test results. Nine different mass/drop height combinations were used with five sample types. The coefficient of restitution (FIG. 2A) and the force transmitted through the sample (FIG. 2B) and are shown, along with a curve fit for e*. Notice that the amount of energy absorbed by the sample reaches a maximum when the sample contains approximately 6 percent liquid. Sample types: 0=100% TangoBlack+; 4=96% TangoBlack+, 4% liquid; 14=86% TangoBlack+, 14% liquid; 25=75% TangoBlack+, 25% liquid; 36=64% TangoBlack+, 36% liquid.

In contrast to the low-strain, controlled-rate cyclic testing performed on the DMA, impact loads are often rapid, high magnitude, one-time events. In order to characterize the impact protection that PVMs could provide, we performed impact tests using a custom built testing apparatus. The test consisted of 44.4 g or 223 g masses suspended from nylon lines that were dropped from predetermined heights at samples which were mounted on a quartz crystal force sensor. The sensor, sampled at 48 kHz by at 14 bit USB DAQ card, was attached to a granite slab to ensure there was no compliance in the sensor mount. Test PVM samples were 63.5 mm in diameter ($A_0=3.17\ e^{-3}\ m^2$), 12.7 mm in height ($L_0=1.27\ e^{-2}\ m$). The masses were dropped from heights of 100 mm through 500 mm in increments of 100 mm. High speed videos (1820 fps) of the impact were collected via an Edgertronic high speed camera and processed in MATLAB to determine incoming and outgoing velocities of the masses. The coefficient of restitution $e^*|V_{out}/V_{in}|$ was calculated from the processed video data and plotted against $P_l$ for the nine different impact energy cases in FIG. 2A. A quadratic model, shown in Equation 6, fit this data with a standard error of RMSE=0.0136 and yields a mapping between the coefficient of restitution in impacts, $e^*$, and $P_l$.

Figure 2B:
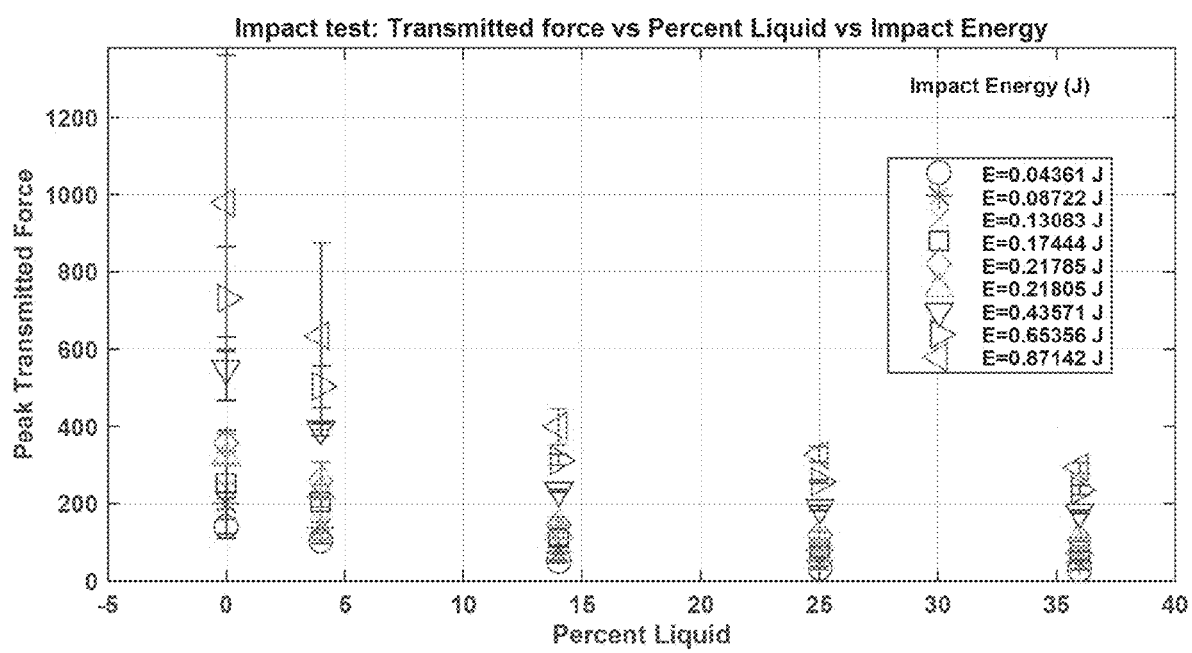
Figure 3:
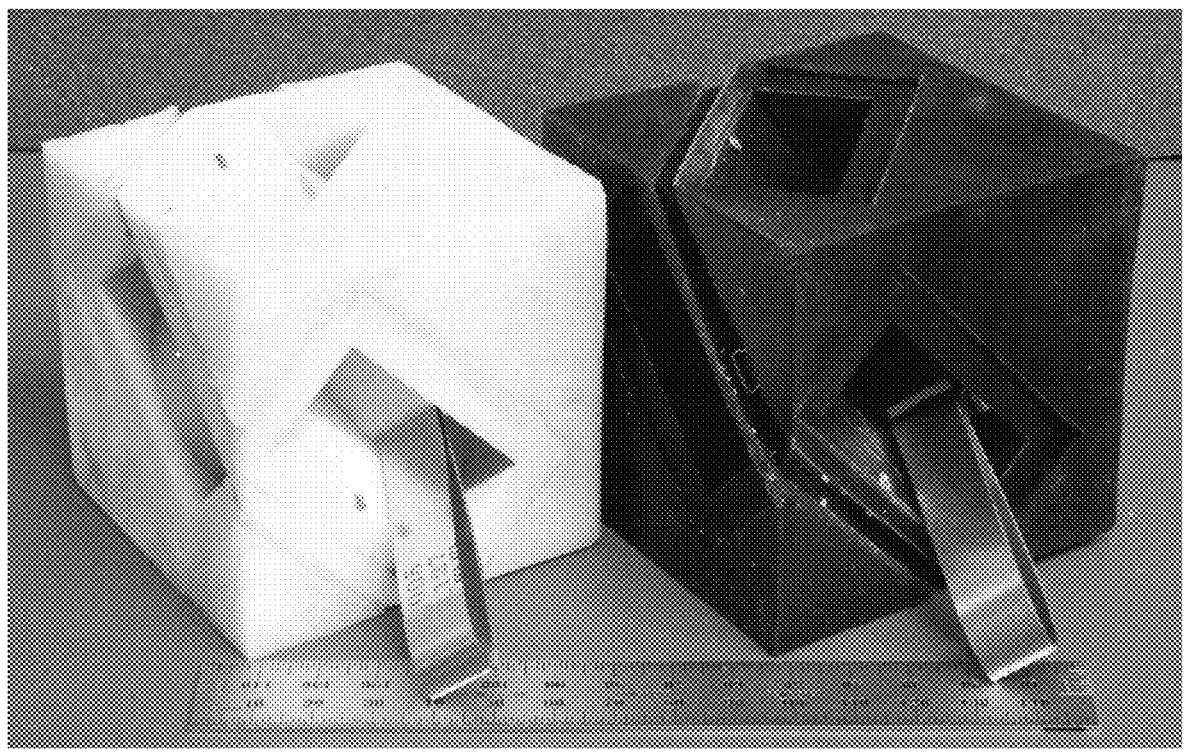
FIG. 3 is a photograph of jumping robots made according to [1], though the skin of the robots differs. The skin of the white robot (left) is made from an elastomer cube and the skin of the black robot (right) is made from a printed viscoelastic material (PVM). A motor rotates and compresses a spring-steel leg, propelling the robot. A vibration-absorbing skin assists landing.

As seen in FIG. 2, the coefficient of restitution finds a minimum in the range of 4% to 10% liquid concentration, indicating that this range of liquid concentration yields materials with the highest energy absorption. The peak impact force on the sample is directly correlated with the stiffness of the sample. Since we can model the sample as a spring with $k \propto E^*$ the stopping distance of the impacting mass should be inversely proportional to $E^*$ and the force is inversely proportional to the stopping distance. Therefore the weaker samples which we can produce at high liquid concentrations provide lower peak forces (and presumably greater impact penetration distances). FIG. 2 shows a decrease in peak force with liquid concentration as expected.

$$e^* p1 P_l^3 + p2 P_l^2 + p3 P_l^1 + p4 \quad (6)$$

$$p1=-1.23e^{-5}, p2=8.05e^{-4}, p3=-8.55e^{-3}, p4=1.5e^{-1}$$

The reduction in peak force can be a significant protection for mobile robots. In our experiments, we see a 700N reduction in peak force by varying from 0% to 25% liquid concentration. This can be the difference in a circuit surviving a shock, a sensor lens cracking upon impact with the ground, or a strut breaking off of a quadrotor. While traditional elastomers can be placed on robots for protection, their high level of recoil can lead to the object simply bouncing off the ground in an uncontrolled manner, causing further damage. A gradual stop without high recoil is preferred to protect any robot from both planned and unplanned ground contact. The programmable relationship between $e^*$ and peak force, allows designers of mobile robots to make a tradeoff between recoil and peak force.

Application: Impact Protection for a Jumping Robot

Jumping robots often experience large accelerations during the jump and land phases. Though the jump phase is often under the designer's control, the landing rarely is, and therefore energy absorbing elements are often desirable.

We used our recent jumping robot [1] to demonstrate the utility of PVMs in this application by printing impact absorbing skins. 3D printing these parts allowed more rapid development of the skin than was possible during the original fabrication, which involved printing molds and casting a commercially available elastomer (Soma Foama, Smooth-On Corp.). Our robot has a cubic shape, and each of its six faces has an opening to allow the jumping mechanism to make contact with the ground. By winding up and releasing a strip spring, the robot can jump in two directions, regardless of orientation. The robot has a main rigid body, 3D printed using ABS materials, that houses the actuation, control, and power. The rigid body is then encased in a soft skin for landing. We used 4 layers of looped metal strip as the spring in each half of our robot. The strips are made of stainless steel 316, and they are 12.7 mm wide, 0.254 mm thick, and 60 mm long. We used two micro DC gear motors (1.1 N-m) to drive the metal strips. The microcontroller (Arduino Pro Micro, 3.3V/8 MHz), rechargeable battery (3.7V, 400 mAh), regulator (9V), motor driver (DRV8833), wireless communication module (XBee 1 mW, 2.4 G Hz), and 9-axis IMU sensors (L3GD20H and LSM303D) are mounted within the space between the bottom plates of two halves.

These jumping robots are designed to use the geared motor to wind up and release the flexible spring legs which kick the robot into the air and towards an objective. The robot then impacts the ground and bounces several times in an uncontrolled manner. The global position control then calculates another jump towards its ultimate destination. With each landing and bounce, uncertainty in the final position and orientation is added to the robot's position and orientation.

We fit this jumping robot with different PVM skins ($P_l\varepsilon[0\%, 18\%, 25\%, 36\%]$) and compared them to the original elastomeric foam design. We used the accelerometer inside the robot to measure the peak acceleration (as a proxy for likely damage) and the number of bounces after each jump. By minimizing acceleration, a designer can predict that the robot will have a longer cycle life before failure. Additionally, a lower peak acceleration on landing reduces the damage to the surface the robot lands on. The number of bounces after landing serves as a metric for the maintenance of orientation and position during the landing process.

Figure 4:
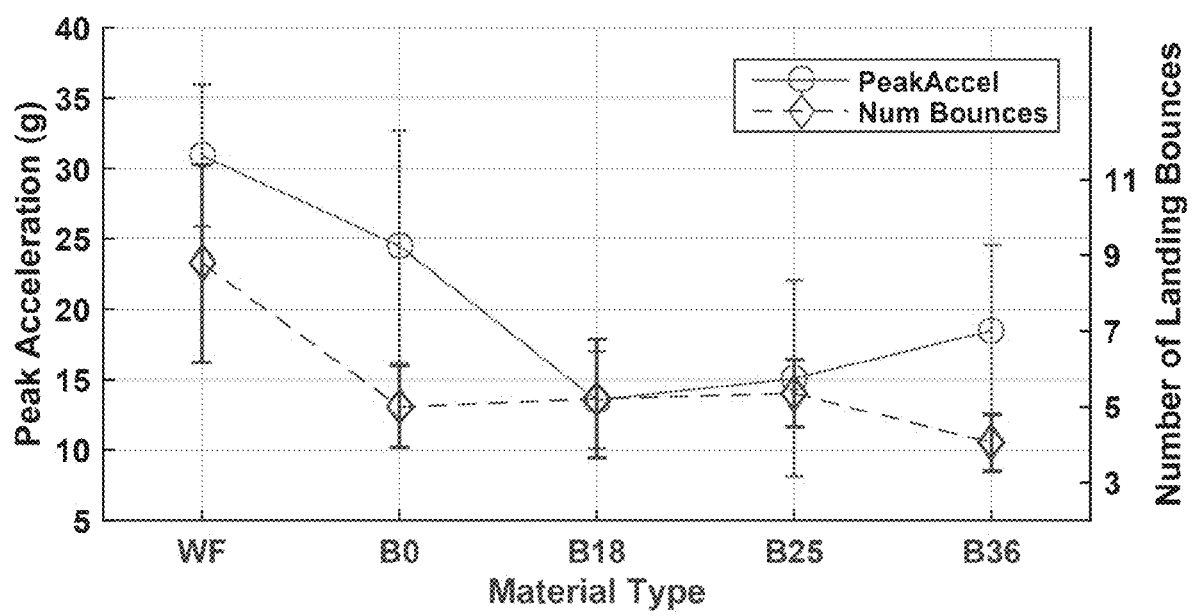
FIG. 4 is a graph showing impact absorbing skin test on a jumping robot. By applying a 3D-printed skin to a jumping robot, the peak acceleration and number of landing bounces can be reduced, relative to a commercially-available bulk material. WF=SomaFoama 25; B0=100% TangoBlack+; B18=82% TangoBlack+, 18% liquid; B25=75% TangoBlack+, 25% liquid; B36=64% TangoBlack+, 36% liquid.
Figure 5A:
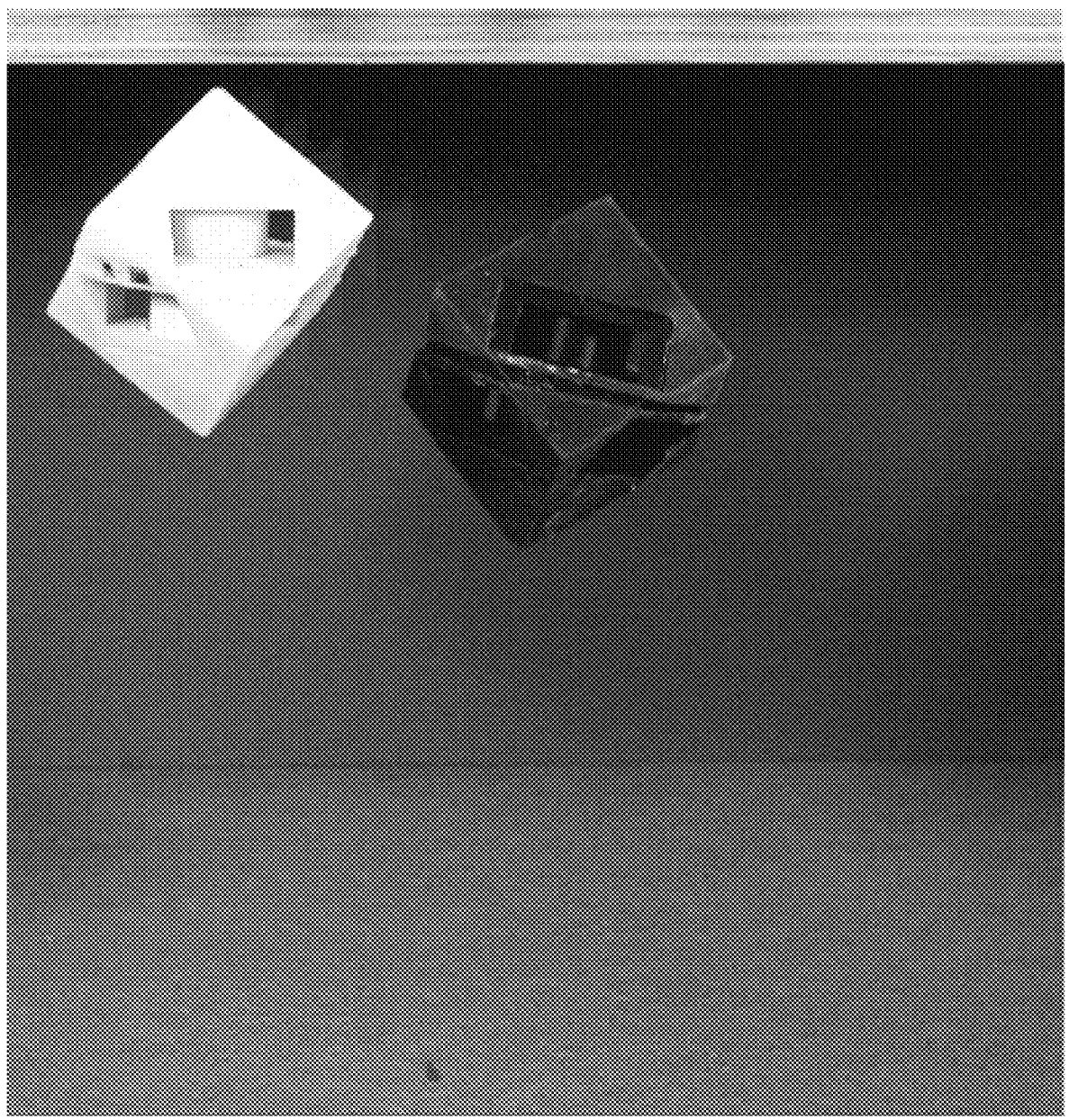
FIGS. 5A-D are a series of photographs showing an elastomer cube (white; left) and a printed viscoelastic material (PVM) cube (black; right) were dropped from the same height (FIG. 5A) and landed on their corners (FIG. 5B). In contrast to the PVM cube, the elastomer cube rebounded several body-heights (FIG. 5C) before both cubes settled (FIG. 5D).
Figure 5B:
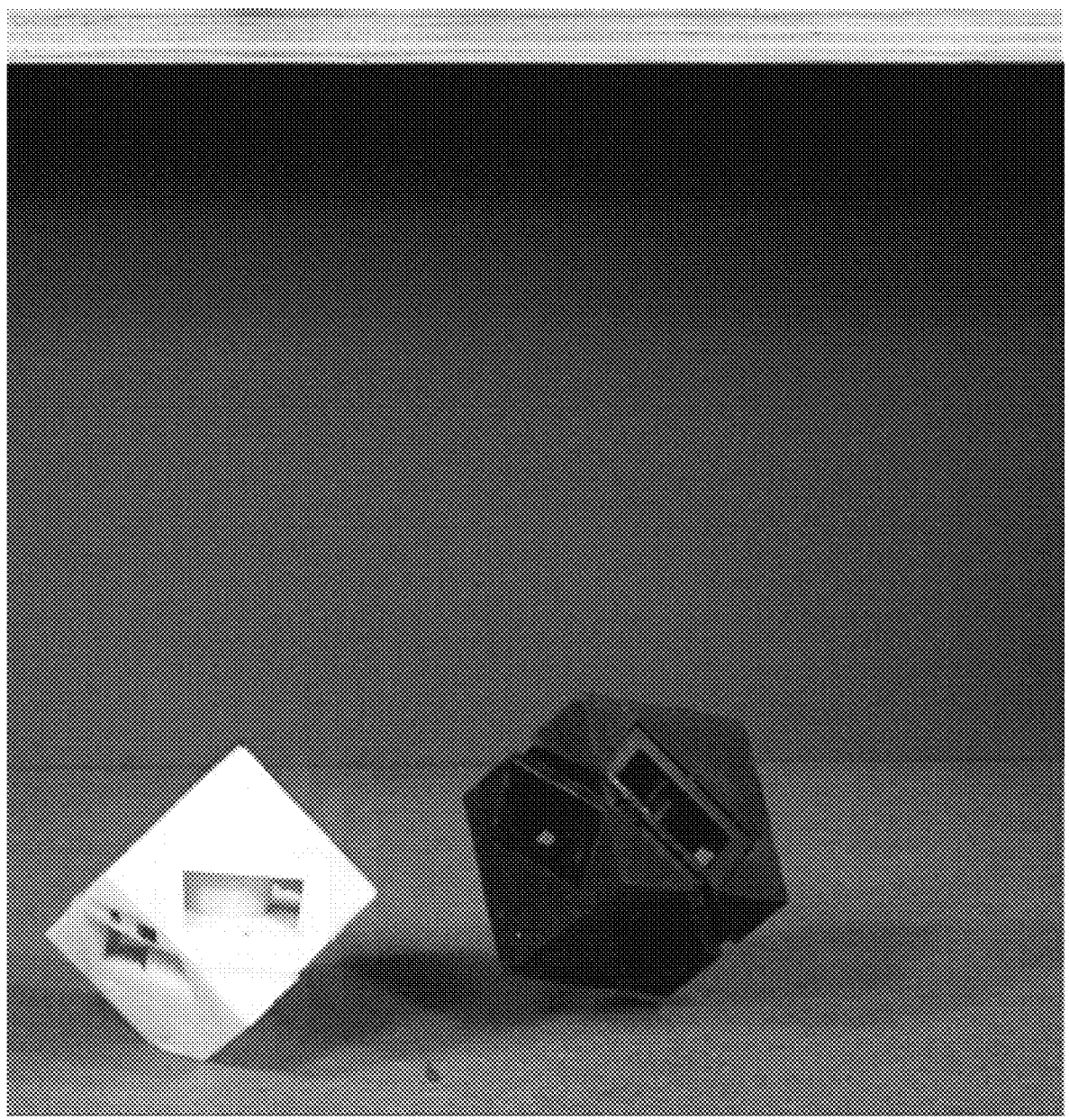
Figure 5C:
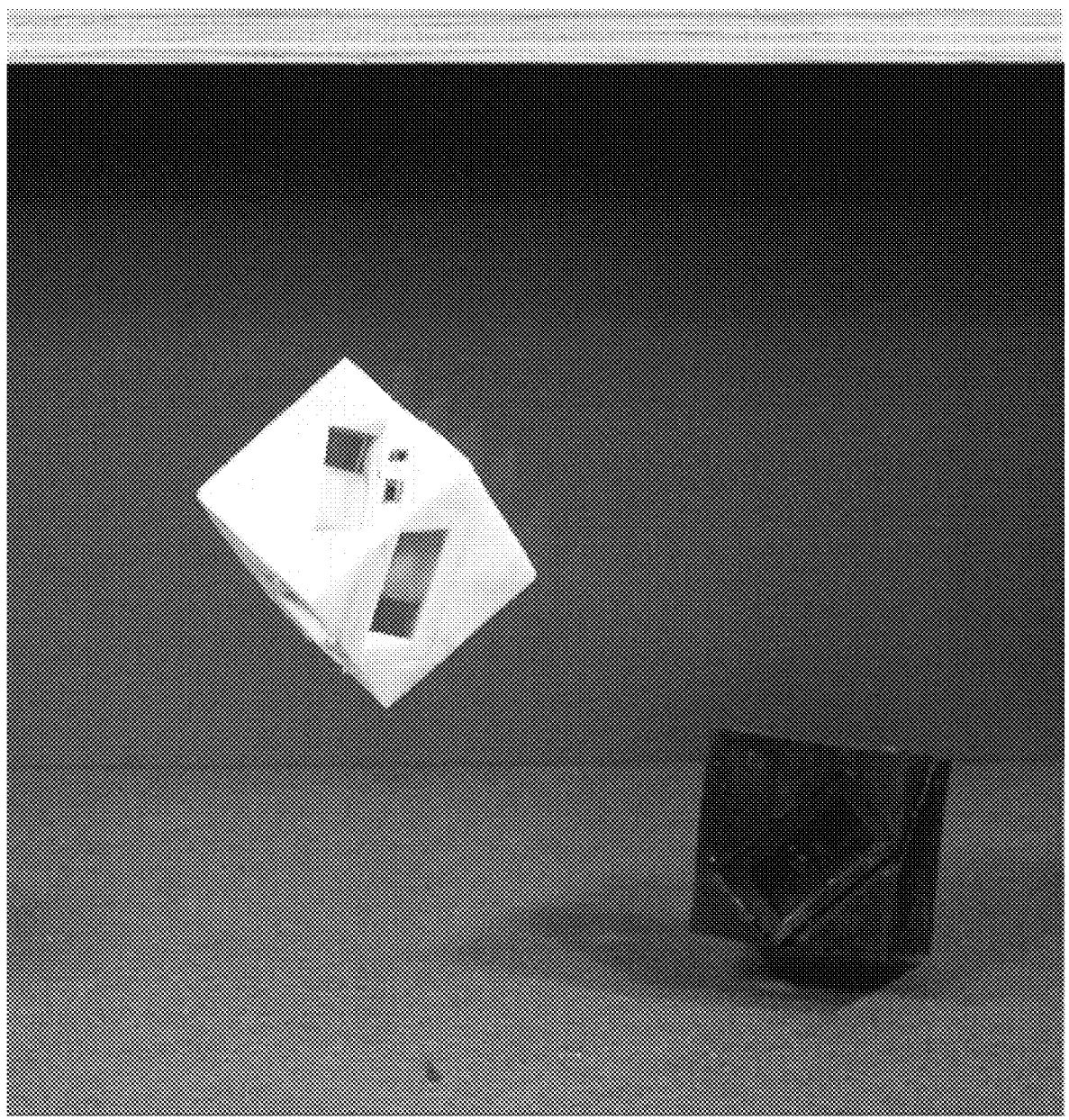
Figure 5D:
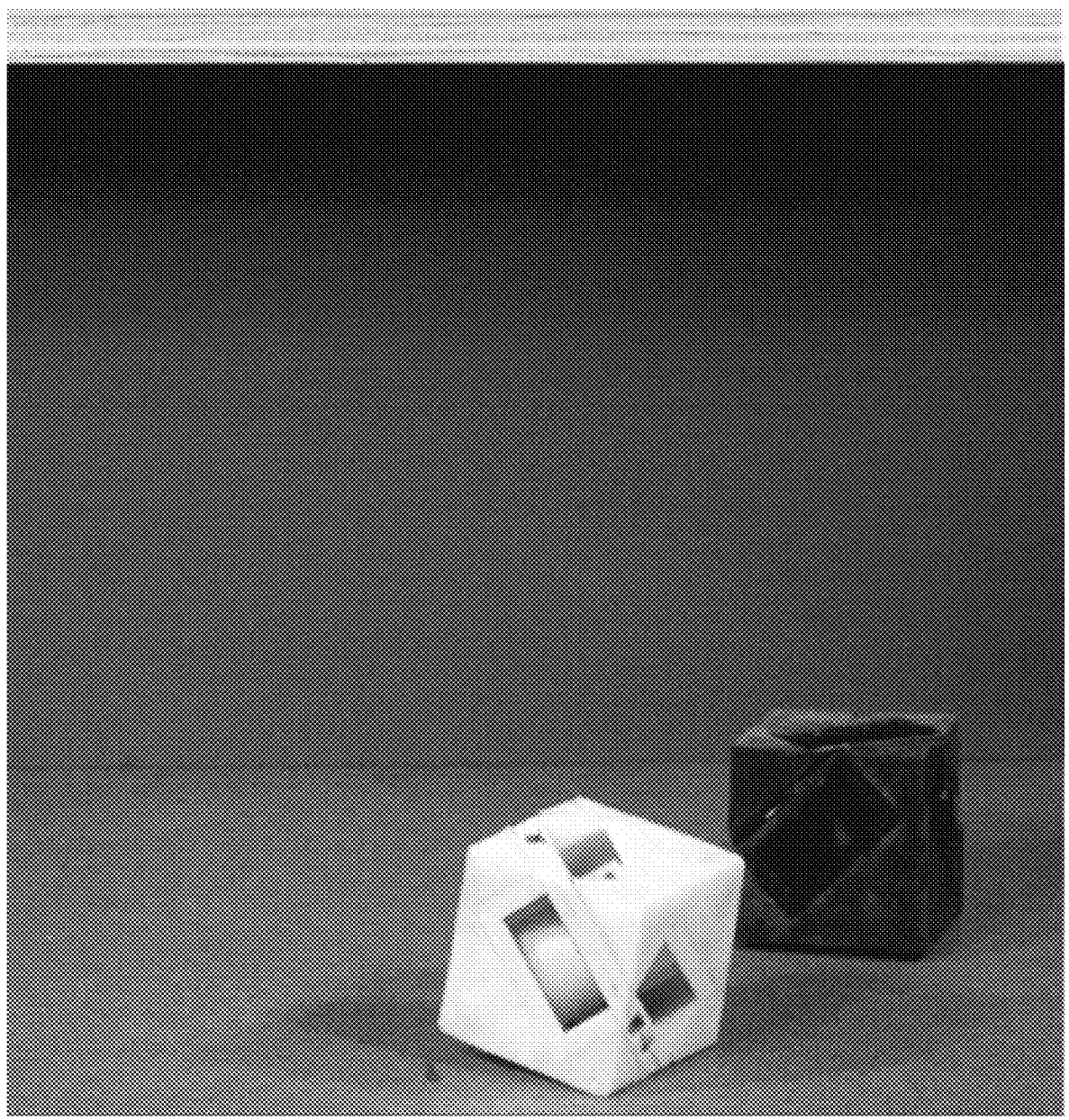

All of the printed skins outperformed the original elastomeric foam on peak acceleration and number of bounces. FIG. 4 shows that the peak acceleration can be reduced by half with an 18% liquid concentration. From the data we can conclude that the PVM reduces the number of bounces and decreases the acceleration compared to the elastomer, but we cannot determine a clear trend within the PVMs with respect to peak acceleration. In fact, it appears that peak acceleration actually increases slightly with concentrations above 18%. This could be because the higher liquid concentrations cause the robot to bottom out upon landing. The 36% has a $E'|_{1\ Hz}$ which is nearly half the 18% value. The lower resulting K value should double the stopping distance and halve the peak force, unless the impact-absorber bottoms out, which would transfer the remaining impact to the rigid inner skeleton. These results suggest that the concentrations need to be tailored not only for minimum spring constants, but also for the allowable compression distances.

Figure 6:
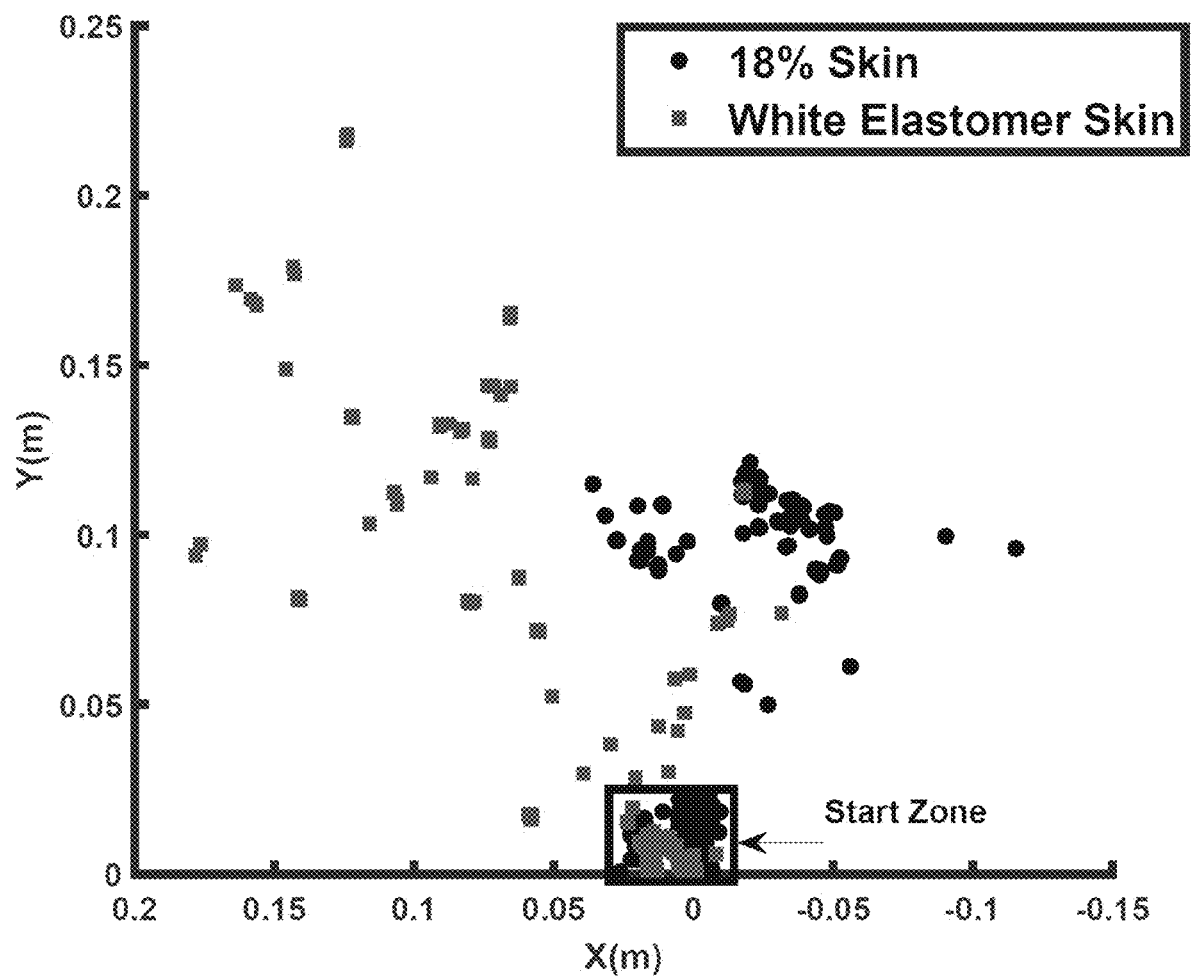
FIG. 6 is a graph of Y (m) vs. X (m). An elastomer cube (red squares) and a PVM cube with 18% liquid (black dots) jumped from the same starting position. Points near (0,0), inside the starting square, are the starting locations. The black cube lands in a more predictable area than the elastomer cube.

We compared the performance of two cubes fitted with $P_l=18\%$ PVM and elastomer skins by commanding the cubes to repeatedly jump from the same location, in the same direction. The reduced bouncing observed with the PVM skin leads to a more consistent landing pattern. FIG. 6 shows that the PVM cube traveled a shorter distance than the elastomer cube, though in a more consistent manner. The elastomer-skinned cube bounces and rolls farther with each jump than the same cube with a PVM skin, but it has a larger variance in its final position. The results in FIG. 6 demonstrate that the PVM skins help to reduce the landing point uncertainty.

Application: Vibration Isolation

Figure 7A:
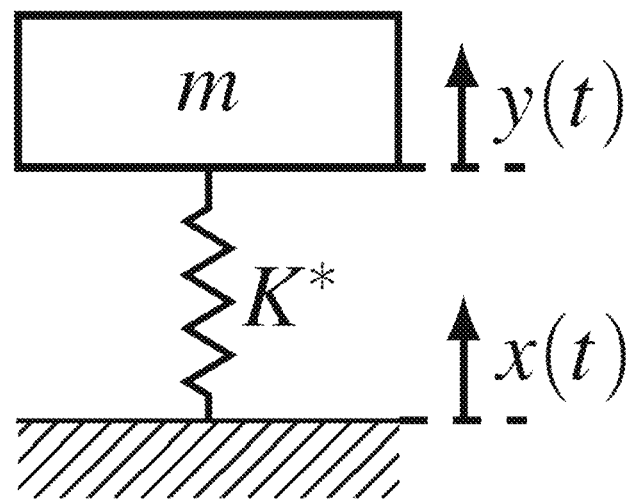
FIGS. 7A-B are vibration-isolation examples employing PVM.
Figure 7B:
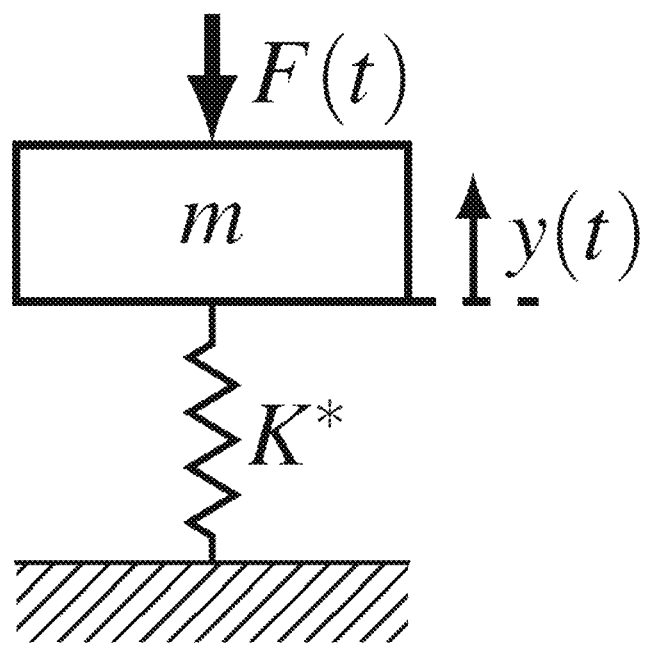

Since we can model the complex modulus $E^*$ of the material as a function of $P_l$ we can design transfer functions for vibrating systems of different sizes and masses. Here we provide two common vibration-isolation examples: base excitation and disturbance rejection (see FIG. 7). The standard formulation for the spring constant of a bar of homogeneous material is given in Equation 7. Combining Equations 7 and 5 yields the complex spring constant of the form in Equation 8. We can then model a mass m with a complex spring and base excitation as a difference between the base position x(t) and the mass position y(t) seen in Equation 9. We assume a solution of the form y(t)=Y exp(iωt), x(t)=X exp(iωt) and get the transfer function in Equation 10.

$$K = \frac{A_0}{L_0}E \quad (7)$$

$$K^* = \frac{A_0}{L_0}E'|_{1Hz}(\omega^{n_1} + i*\tan(\delta)|_{1Hz}*\omega^{n_2}) \quad (8)$$

$$m\ddot{y} + K^*(P_l)*(y-x) = 0 \quad (9)$$

$$T_{base}(\omega, m, K^*) = \frac{Y}{X} = \frac{K^*(P_l)}{m\omega^2 + K^*(P_l)} \quad (10)$$

$$m\ddot{y} + K^*(P_l)*y = F(t) \quad (11)$$

$$F(t) = F_0 * \cos(\omega_d t) \quad (12)$$

$$T_{driven}(\omega_d, m, K^*) = \frac{Y}{F} = \frac{1}{m\omega_d^2 + K^*(P_l)} \quad (13)$$

Figure 8:
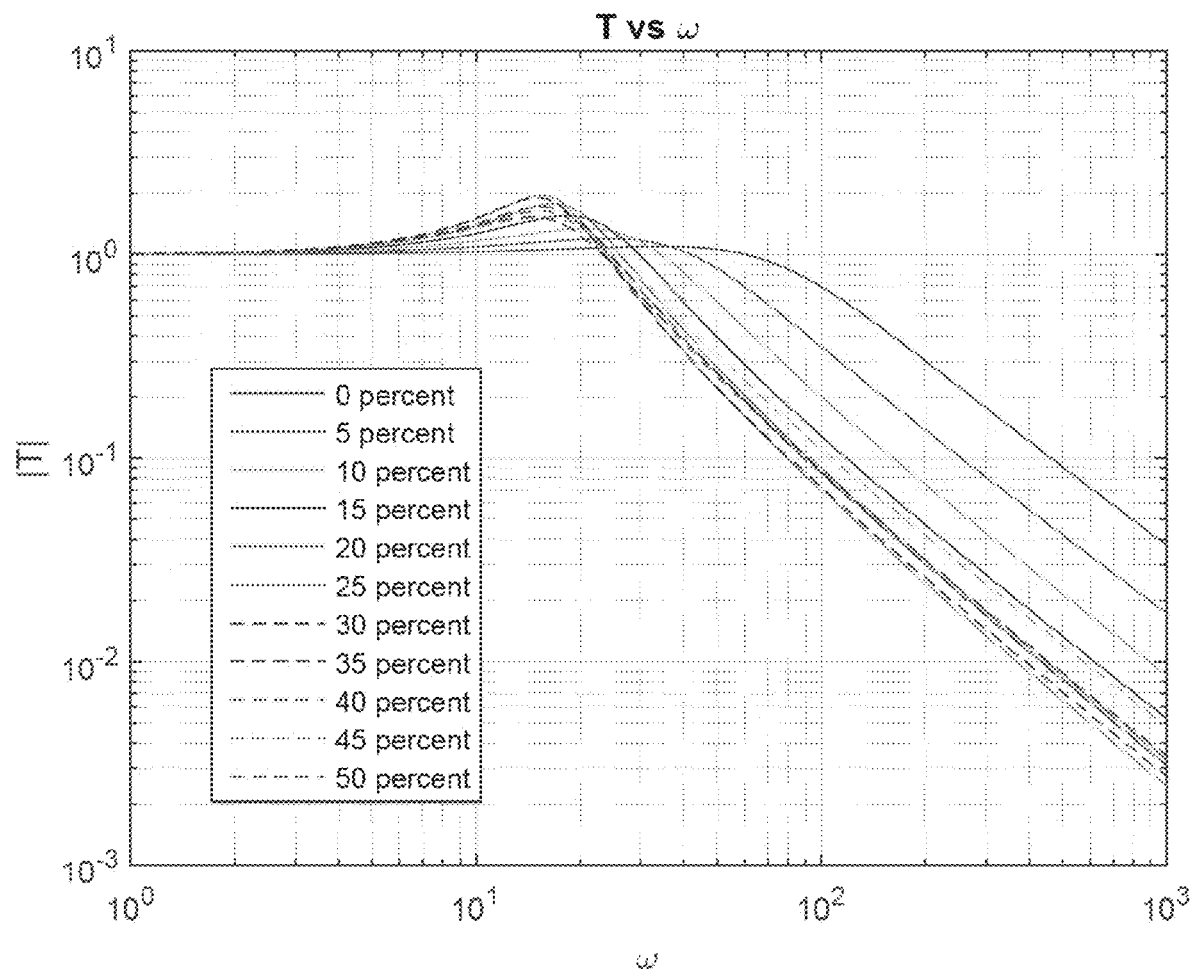
FIG. 8 is a graph of T vs. ω. The transfer function magnitude can be controlled by varying the percent liquid concentration of the material.
Figure 9:
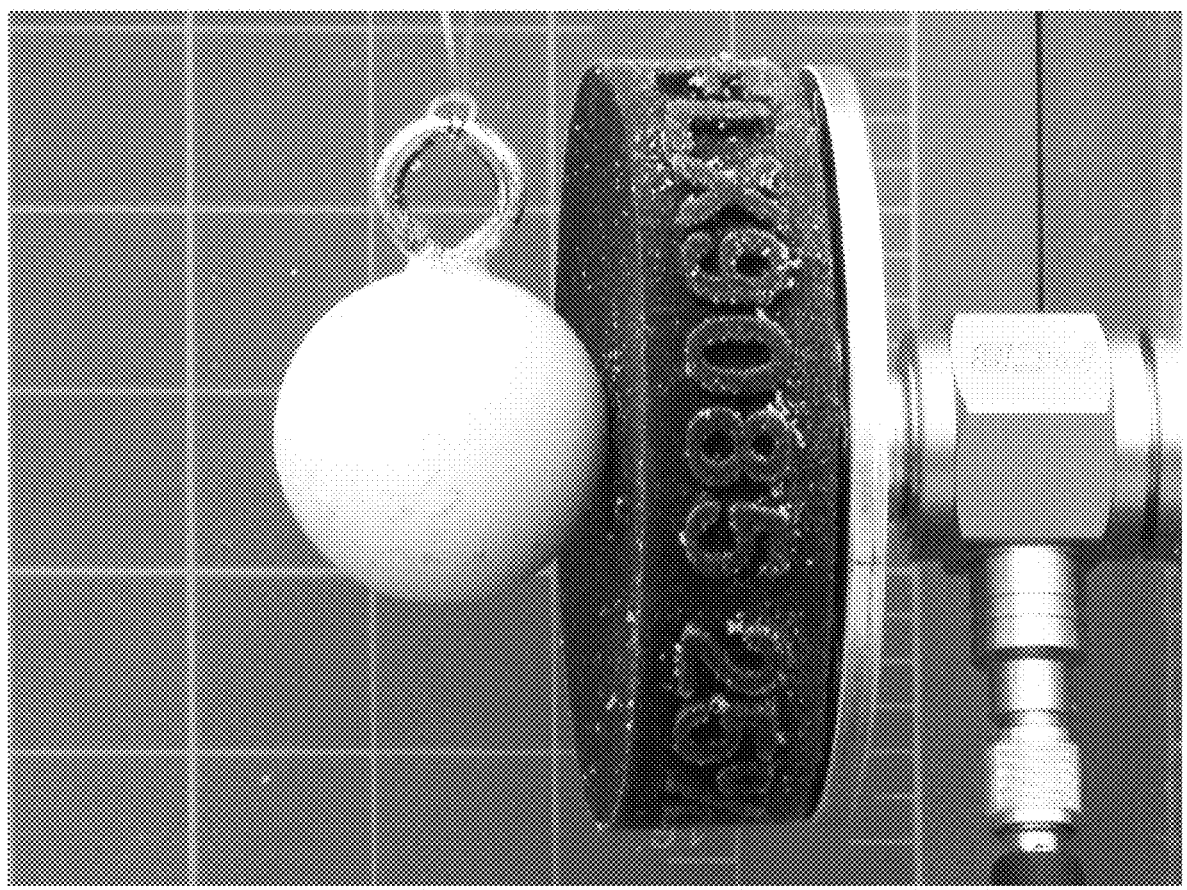
FIG. 9 is a photograph of a visco-elastic sample attached to a lightweight backer plate. A spherical mass impacts the visco-elastic sample at predetermined speeds. The incident and rebound velocities of the mass are recorded via high-speed video. The transmitted force is measured by a piezoelectric sensor and sampled at 48 kHz.

This leads to a system with 3 free parameters, $A_0$, $L_0$ and $P_l$ to control a magnitude of oscillation for a system of mass m. In FIG. 8 we see a characteristic transfer function magnitude for a system with a 44.4 g mass, 63.5 mm diameter and 12.7 mm thickness. We can see that regardless of the liquid concentration, the material is highly damped, leading to little response at any resonant frequency. However, in this example materials with higher $P_l$ yield better performance at higher frequencies.

In the disturbance-rejection example, if the driving force is of the form in Equation 12, and the position of the mass is defined at y(t), then the dynamics are described by Equation 12. The transfer function between force and displacement ($T_{driven}$) is of the form of Equation 13. Only $K^*$ is a free variable that describes the magnitude of the transfer function. $K^*$ itself a function of the area and length of the spring, and the complex modulus, as described in Equation \ref{eq:3}. Specifying the size of the spring leaves only the complex modulus $E^*$ as a free parameter in the system and it is a function of $P_1$ alone. To prevent the system from bottoming out one must minimize the transfer function such that $$\frac{m*g + F_0}{K} > 0.5 * L_0,$$

where g is the strength of gravity.

Figure 12A:
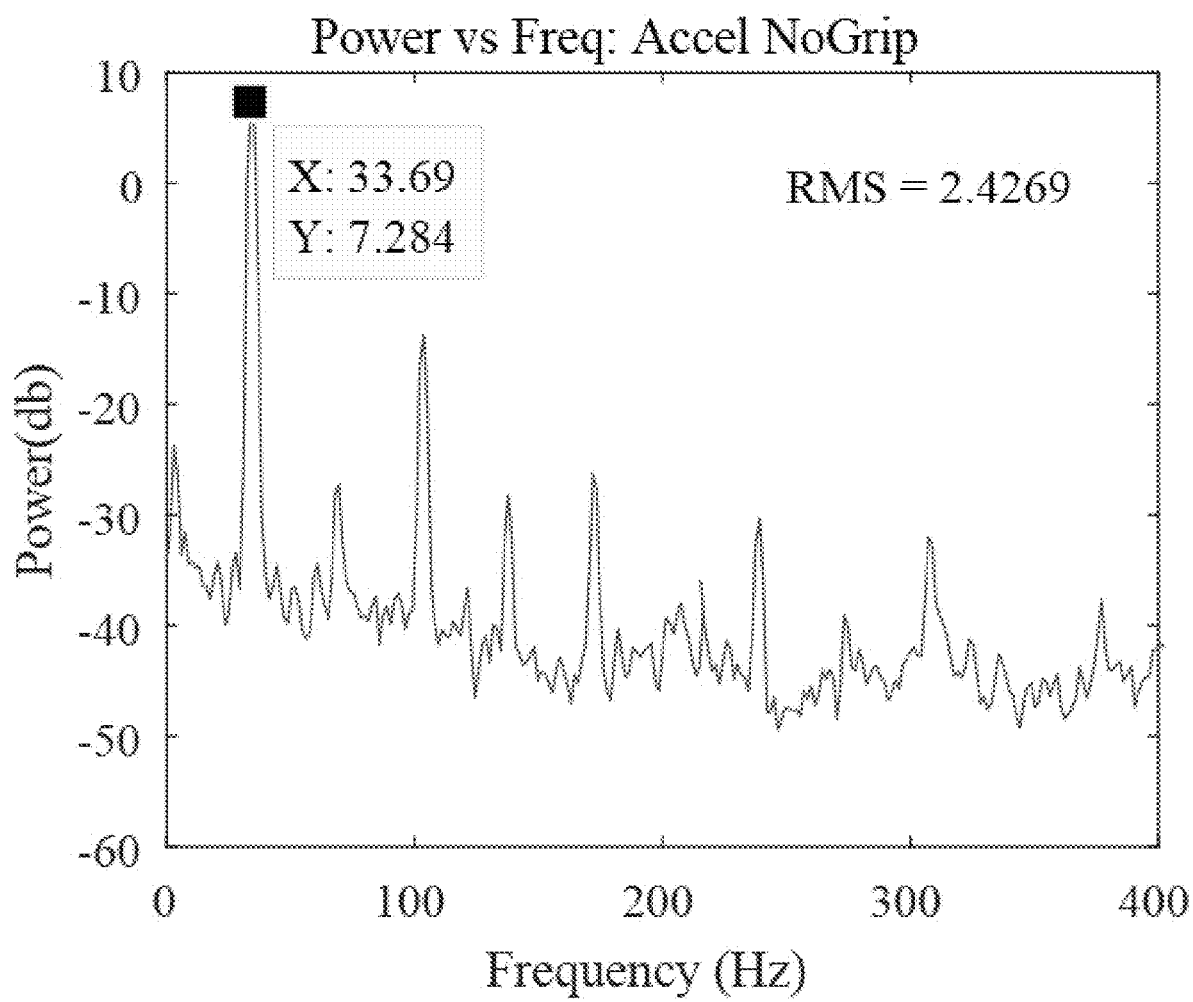
FIGS. 12A-B are graphs of power vs. frequency for vibrations at the wrist of a person without (FIG. 12A) and with (FIG. 12B) a printed viscoelastic grip.
Figure 12B:
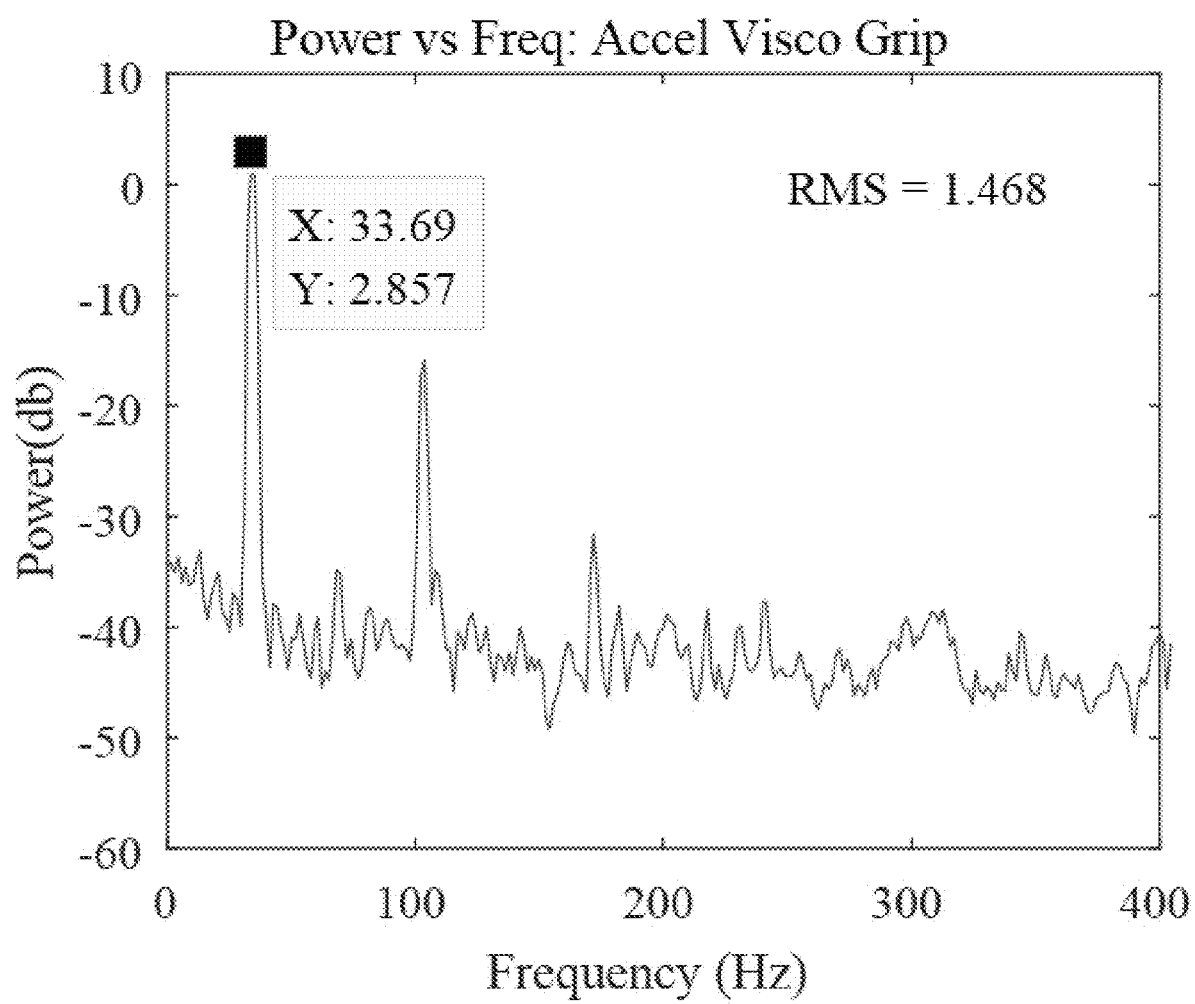

Vibration isolation has applications for humans as well. Vibration can cause Hand-Arm Vibration Syndrome, which can lead to neurological, vascular and musculoskeletal injuries. These are often induced by exposure to vibration over many years. We 3D printed custom viscoelastic grips for a jigsaw and measured the vibration of a human users' wrist, with and without the printed viscoelastic grips. FIG. 12A is the power spectral density for vibrations at the wrist for a person without a grip manufactured according to the methods described herein. There is a significant amount of power spikes in the higher frequencies. FIG. 12B is the power spectral density for a person provided with a printed viscoelastic grip manufactured according to the methods described herein. Aside from the excitation of the peak at 33.69 Hz being substantially reduced from 7.284 dB to 2.857 dB, the magnitude of the peaks are substantially reduced at frequencies greater than 200 Hz. This demonstrates that the printed grip reduces vibration exposure to people who use it.

CONCLUSIONS

We have presented an accessible and scalable technique for designing and fabricating user-defined viscoelastic damping materials using commercially-available 3D printers and materials. The process allows customized viscoelastic dampers to be automatically fabricated in arbitrary shapes. Rather than printing complex multi-part molds, selecting materials, and then fabricating a custom part in the lab, robot designers can now optimize the material properties and directly 3D print their custom soft damper parts.

Our model of the material allows designers to determine the correct liquid concentration for the desired E' and E'' properties and frequency response of the material. By taking into account the working space, the spring constant can be optimized to reduce the impact force and recoil. For vibrating systems, the transfer function of the mass-spring system can be minimized against the frequency range, maximum displacements and mass.

There are many potential applications in the robotics community. For example, this technique could make it possible to design grippers with printable PVM layers that minimize the transmitted vibrations from the end-effector to the arm, reducing actuator wear and control effort to maintain position. Customized impact protecting skins/pads based on PVMs could allow robots to be more resilient to impacts, to be more accurate when landing, and to reduce controller complexity and effort. The vibration damping properties of PVMs can be used in traditional hard robotics to protect sensitive parts such as cameras and electronics from the vibrations of motors, generators and movement. In the future this material and process may find applications in a wide range of fields, including custom sporting gear, personal protective equipment, and vibration isolation in cameras or industrial equipment.

The methods described herein contemplate depositing more than one type of solidifying material. For example one of the solidifying materials can be a support material, which can optionally be removed. The method described herein also contemplate depositing more than one type of non-solidifying material.

In some embodiments, the occupancy matrix can be a region or subregion of a larger object. An additional benefit of an occupancy matrix for a region or subregion is that different regions of an object can have different mechanical properties. For example a plurality of regions can be placed next to each other to create a gradient of mechanical properties. Additionally, occupancy matrices can be very large (e.g., ten billion voxels), which can occupy a significant amount of memory in a 3D printer. Generating smaller matrices for regions or subregions of an object can reduce the memory requirements for a 3D printer. For example, an occupancy matrix can be generated for a first layer of an object, then a new occupancy matrix can be generated for successive layers of an object. In this particular embodiment, the occupancy matrix is a two dimensional matrix generated for each layer.

REFERENCES

[1] S. Li, R. Katzschmann, and D. Rus, "A soft cube capable of controllable continuous jumping," in Intelligent Robots and Systems (IROS), 2015 IEEE/RSJ International Conference on. IEEE, 2015, pp. 1712-1717.
[2] SandFlea spec sheet, Boston Dynamics. [Online]. Available: http://www.bostondynamics.com/img/SandFlea%20Datasheet%20v1_0.pdf
[3] R. Niiyama, A. Nagakubo, and Y. Kuniyoshi, "Mowgli: A bipedal jumping and landing robot with an artificial musculoskeletal system," in Proc. IEEE Int. Conf. on Robotics and Automation (ICRA 2007), Roma, Italy, April 2007, pp. 2546-2551 (ThC5.2).
[4] R. Armour, K. Paskins, A. Bowyer, J. Vincent, and W. Megill, "Jumping robots: a biomimetic solution to locomotion across rough terrain," Bioinspiration & biomimetics, vol. 2, no. 3, p. S65, 2007.
[5] R. V. Martinez, A. C. Glavan, C. Keplinger, A. I. Oyetibo, and G. M. Whitesides, "Soft actuators and robots that are resistant to mechanical damage," Advanced Functional Materials, vol. 24, no. 20, pp. 3003-3010, 2014.
[6] M. T. Tolley, R. F. Shepherd, M. Karpelson, N. W. Bartlett, K. C. Galloway, M. Wehner, R. Nunes, G. M. Whitesides, and R. J. Wood, "An untethered jumping soft robot," in Intelligent Robots and Systems (IROS 2014), 2014 IEEE/RSJ International Conference on. IEEE, 2014, pp. 561-566.
[7] B. M. Yamauchi, "Packbot: a versatile platform for military robotics," in Defense and Security. International Society for Optics and Photonics, 2004, pp. 228-237.
[8] J. Paulos, A. Argondizza, and E. Garcia, "Reduced weight hydraulic actuation for small mobile applications," in 50th AIAA Aerospace Sciences Meeting including the New Horizons Forum and Aerospace Exposition, 2012, p. 137.
[9] A. D. Marchese, C. D. Onal, and D. Rus, "Autonomous soft robotic fish capable of escape maneuvers using fluidic elastomer actuators," Soft Robotics, vol. 1, no. 1, pp. 75-87, 2014.
[10] C. Stergiopulos, D. Vogt, M. T. Tolley, M. Wehner, J. Barber, G. M. Whitesides, and R. J. Wood, "A soft combustion-driven pump for soft robots," in ASME 2014 Conference on Smart Materials, Adaptive Structures and Intelligent Systems. American Society of Mechanical Engineers, 2014, pp. V002T04A011-V002T04A011.
[11] M. Raibert, K. Blankespoor, G. Nelson, R. Playter et al., "Bigdog, the rough-terrain quadruped robot," in Proceedings of the 17th World Congress, International Federation of Automatic Control, 2008, pp. 10 823-10 825.
[12] B. Samali and K. Kwok, "Use of viscoelastic dampers in reducing wind-and earthquake-induced motion of building structures," Engineering Structures, vol. 17, no. 9, pp. 639-654, 1995.
[13] D. Karnopp, "Active damping in road vehicle suspension systems," Vehicle System Dynamics, vol. 12, no. 6, pp. 291-311, 1983.
[14] K. B. Shimoga and A. A. Goldenberg, "Soft robotic fingertips part i: A comparison of construction materials," The International Journal of Robotics Research, vol. 15, no. 4, pp. 320-334, 1996.
[15] E. I. Rivin, E. I. Rivin, and E. I. Rivin, Passive vibration isolation. Asme press New York, 2003.
[16] D. Lee and D. P. Taylor, "Viscous damper development and future trends," The Structural Design of Tall Buildings, vol. 10, no. 5, pp. 311-320, 2001.
[17] J. C. Snowdon, "Vibration isolation: use and characterization," Rubber Chemistry and Technology, vol. 53, no. 5, pp. 1041-1087, 1980.
[18] R. MacCurdy, R. Katzschmann, Y. Kim, and D. Rus, "Printable hydraulics: A method for fabricating robots by 3d co-printing solids and liquids," in Robotics and Automation (ICRA), 2016 IEEE International Conference on. IEEE, 2016.
[19] I. Argatov, "Mathematical modeling of linear viscoelastic impact: Application to drop impact testing of articular cartilage," Tribology International, vol. 63, pp. 213-225, 2013.
[20] F. Varga, M. Drzik, M. Handl, J. Chlpik, P. Kos, E. Filov'a, M. Rampichova, A. Necas, T. Trc, and E. Amler, "Biomechanical characterization of cartilages by a novel approach of blunt impact testing," Physiological research, vol. 56, p. S61, 2007.
[21] D. T. Chen, Q. Wen, P. A. Janmey, J. C. Crocker, and A. G. Yodh, "Rheology of soft materials," Condensed Matter Physics, vol. 1, 2010.

INCORPORATION BY REFERENCE AND EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of forming a cellular foam having viscoelastic properties, the method comprising:
a) generating an occupancy matrix from a probabilistic function, wherein the probabilistic function is based on a prescribed percent liquid in a region of the cellular foam;
b) depositing a layer of droplets of a solidifying material and a non-solidifying material, the droplets being deposited according to the occupancy matrix specifying voxels for the solidifying and non-solidifying materials, the solidifying and non-solidifying material being interspersed within the voxels specified by the occupancy matrix;
c) exposing the droplets to ultraviolet radiation to cure the solidifying material, but not the non-solidifying material; and
d) repeating b) and c) to deposit additional layers of droplets of solidifying and non-solidifying materials, thereby forming the cellular foam having viscoelastic properties.

2. The method of claim 1, wherein the probabilistic function is a random function.

3. The method of claim 1, wherein the prescribed percent liquid is based on a predetermined physical property of the structure cellular foam.

4. The method of claim 3, wherein the predetermined physical property of the cellular foam is storage modulus, loss modulus, or ratio of storage modulus to loss modulus.

5. The method of claim 3, wherein the cellular foam has isotropic mechanical properties.

6. The method of claim 3, wherein the cellular foam has anisotropic mechanical properties.

7. The method of claim 6, wherein the percent liquid varies as a function of position.

8. The method of claim 6, wherein the percent liquid is radially symmetric in two dimensions and varying in a third dimension.

9. The method of claim 8, wherein the percent liquid varies with height.

10. The method of claim 1, wherein each dimension of the voxels is between 5 μm and 50 μm.

11. The method of claim 1, wherein 50% to 99% of the voxels are solidifying material.

12. The method of claim 11, wherein 64% to 96% of the voxels are solidifying material.

13. The method of claim 1, wherein the occupancy matrix has three dimensions.

14. The method of claim 1, wherein the occupancy matrix has two dimensions.

15. The method of claim 1, wherein the occupancy matrix specifies a region of the object.

16. The method of claim 1, further comprising depositing a second solidifying material.

17. The method of claim 1, further comprising depositing a second non-solidifying material.

18. The method of claim 1, wherein the occupancy matrix for a subsequent layer is generated while depositing the layer of droplets of solidifying and non-solidifying materials.

19. The method of claim 1, wherein the cellular foam is an open cellular foam.

20. The method of claim 1, wherein the cellular foam is a closed cellular foam filled with liquid.

* * * * *

UNITED STATES PATENT AND TRADEMARK OFFICE
CERTIFICATE OF CORRECTION

PATENT NO. : 11,052,597 B2  
APPLICATION NO. : 15/597068  
DATED : July 6, 2021  
INVENTOR(S) : Robert Bruce MacCurdy, Daniela Rus and Jeffrey Ian Lipton Page 1 of 1

It is certified that error appears in the above-identified patent and that said Letters Patent is hereby corrected as shown below:

In the Specification

Column 1, Line 14; delete "U.S. Pat. No. 1,226,883" and replace with -- IIS-1226883 --.

In the Claims

In Claim 3, Column 16, Line 62; delete "structure".

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*